(12) United States Patent
Jeong et al.

(10) Patent No.: US 12,058,465 B2
(45) Date of Patent: Aug. 6, 2024

(54) IMAGE SENSOR DEVICE AND OPERATION METHOD THEREOF

(71) Applicant: SAMSUNG ELECTRONICS CO., LTD., Suwon-si (KR)

(72) Inventors: Jinyoung Jeong, Suwon-si (KR); Jewon Lee, Suwon-si (KR); Seokyong Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/970,986

(22) Filed: Oct. 21, 2022

(65) Prior Publication Data

US 2023/0041316 A1    Feb. 9, 2023

(30) Foreign Application Priority Data

Nov. 19, 2021 (KR) ................ 10-2021-0160732
Jul. 28, 2022 (KR) ................ 10-2022-0094259

(51) Int. Cl.
 *H04N 25/772* (2023.01)
 *H04N 25/709* (2023.01)

(52) U.S. Cl.
 CPC ......... *H04N 25/772* (2023.01); *H04N 25/709* (2023.01)

(58) Field of Classification Search
 CPC ..... H04N 25/772; H04N 25/709; H04N 25/67
 USPC .................................................. 348/207.99
 See application file for complete search history.

(56) References Cited

U.S. PATENT DOCUMENTS

| | | | |
|---|---|---|---|
| 7,382,296 B2 | 6/2008 | Delanghe et al. | |
| 8,228,402 B2 | 7/2012 | Egawa | |
| 8,233,737 B2 | 7/2012 | Takahashi et al. | |
| 8,446,181 B2 | 5/2013 | Keel et al. | |
| 8,836,313 B2 | 9/2014 | Takagi et al. | |
| 10,313,617 B2 | 6/2019 | Kobuse | |
| 11,082,653 B2 | 8/2021 | Jung et al. | |
| 2009/0213253 A1 | 8/2009 | Fukuoka | |
| 2016/0379699 A1* | 12/2016 | Takahashi | G11C 11/1673 365/158 |
| 2017/0126997 A1* | 5/2017 | Ha | H04N 25/589 |
| 2017/0270333 A1* | 9/2017 | Jeon | G06V 40/1376 |
| 2019/0393259 A1* | 12/2019 | Kanehara | H01L 27/14612 |
| 2020/0007808 A1* | 1/2020 | Jung | H04N 25/616 |
| 2020/0244913 A1* | 7/2020 | Jung | H04N 25/616 |
| 2021/0266477 A1 | 8/2021 | Jung et al. | |
| 2022/0078365 A1* | 3/2022 | Xu | H04N 25/74 |

* cited by examiner

*Primary Examiner* — Lin Ye
*Assistant Examiner* — Chan T Nguyen
(74) *Attorney, Agent, or Firm* — Sughrue Mion, PLLC

(57) ABSTRACT

An image sensor device includes a first image pixel connected to a first data line, a second image pixel connected to the first data line, an analog-to-digital converter that generates a digital signal based on a ramp signal and a voltage level of the first data line, and a clamp signal generator that generates a clamp signal depending on an analog gain of the analog-to-digital converter. While a data voltage is provided from the first image pixel to the first data line, the second image pixel provides a clamp voltage to the first data line based on the clamp signal.

18 Claims, 19 Drawing Sheets

US 12,058,465 B2

IMAGE SENSOR DEVICE AND OPERATION METHOD THEREOF

CROSS-REFERENCE TO RELATED APPLICATIONS

This application claims priority under 35 U.S.C. § 119 to Korean Patent Application No. 10-2022-0094259 filed on Jul. 28, 2022, and Korean Patent Application No. 10-2021-0160732 filed on Nov. 19, 2021, in the Korean Intellectual Property Office, the disclosures of each of which being incorporated by reference herein in their entireties.

BACKGROUND

Embodiments of the present disclosure described herein relate to an image sensor, and more particularly, relate to an image sensor device and an operating method thereof.

An image sensor converts light incident from the outside of the image sensor into an electrical signal. The image sensor is classified as a complementary metal-oxide-semiconductor (CMOS) image sensor or a charge coupled device (CCD) image sensor.

The image sensor may be manufactured through a fine process. Accordingly, noise may occur due to coupling between components of the image sensor. For example, when the image sensor is exposed to a bright light source, smear-like-horizontal-band-noise (SHBN) may occur due to a coupling phenomenon. In this case, the image sensor may output an image including noise having a band form.

SUMMARY

It is an aspect to provide an image sensor device having improved performance and an operating method thereof.

According to an aspect of one or more embodiments, there is provided an image sensor device including a first image pixel connected to a first data line, a second image pixel connected to the first data line, an analog-to-digital converter that generates a digital signal based on a ramp signal and a voltage level of the first data line, and a clamp signal generator that generates a clamp signal depending on an analog gain of the analog-to-digital converter. While a data voltage is provided from the first image pixel to the first data line, the second image pixel provides a clamp voltage to the first data line based on the clamp signal.

According to another aspect of one or more embodiments, there is provided an image sensor device including a pixel array including a plurality of image pixels arranged in a row direction and a column direction, an analog-to-digital converter configured to generate a digital signal based on a voltage output from a first row and a second row of the pixel array, a clamp signal generator configured to generate a clamp signal depending on an analog gain of the analog-to-digital converter, and a row decoder configured to generate a select signal and to provide one of the select signal and the clamp signal to the first row and to provide the other of the select signal and the clamp signal to the second row. When a read-out operation is performed on the first row, the second row outputs a clamp voltage based on the clamp signal, and when a read-out operation is performed on the second row, the second row outputs a reset voltage or a data voltage based on the select signal.

According to yet another aspect of one or more embodiments, there is provided an operating method of an image sensor device including an analog-to-digital converter that generates a digital signal based on voltages output from a first image pixel and a second image pixel to a data line. The method includes generating a clamp signal based on an analog gain of the analog-to-digital converter, while transmitting a pixel output voltage from the first image pixel to the data line, providing the data line with a clamp voltage, which is generated by providing the clamp signal to the second image pixel, and generating the digital signal from the data line based on the pixel output voltage and the clamp voltage.

BRIEF DESCRIPTION OF THE FIGURES

The above and other aspects will become apparent by describing in detail embodiments thereof with reference to the accompanying drawings, in which.

DETAILED DESCRIPTION

Hereinafter, various embodiments will be described in detail and clearly to such an extent that an ordinary one in the art easily implements the present disclosure. Specific details such as detailed components and structures are merely provided to assist the overall understanding of the various embodiments. Therefore, it should be apparent to those skilled in the art that various changes and modifications of the embodiments described herein may be made without departing from the scope and spirit of the present disclosure. Moreover, descriptions of well-known functions and structures are omitted for clarity and brevity. In the following drawings or in the detailed description, configurations may be connected with any other components except for components illustrated in a drawing or described in the detailed description. The terms described below are terms defined in consideration of the functions of the present disclosure and are not limited to a specific function. The definitions of the terms should be determined based on the contents throughout the specification.

Components that are described in the detailed description with reference to the terms "driver", "block", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a microelectromechanical system (MEMS), a passive element, or a combination thereof.

Figure 1:
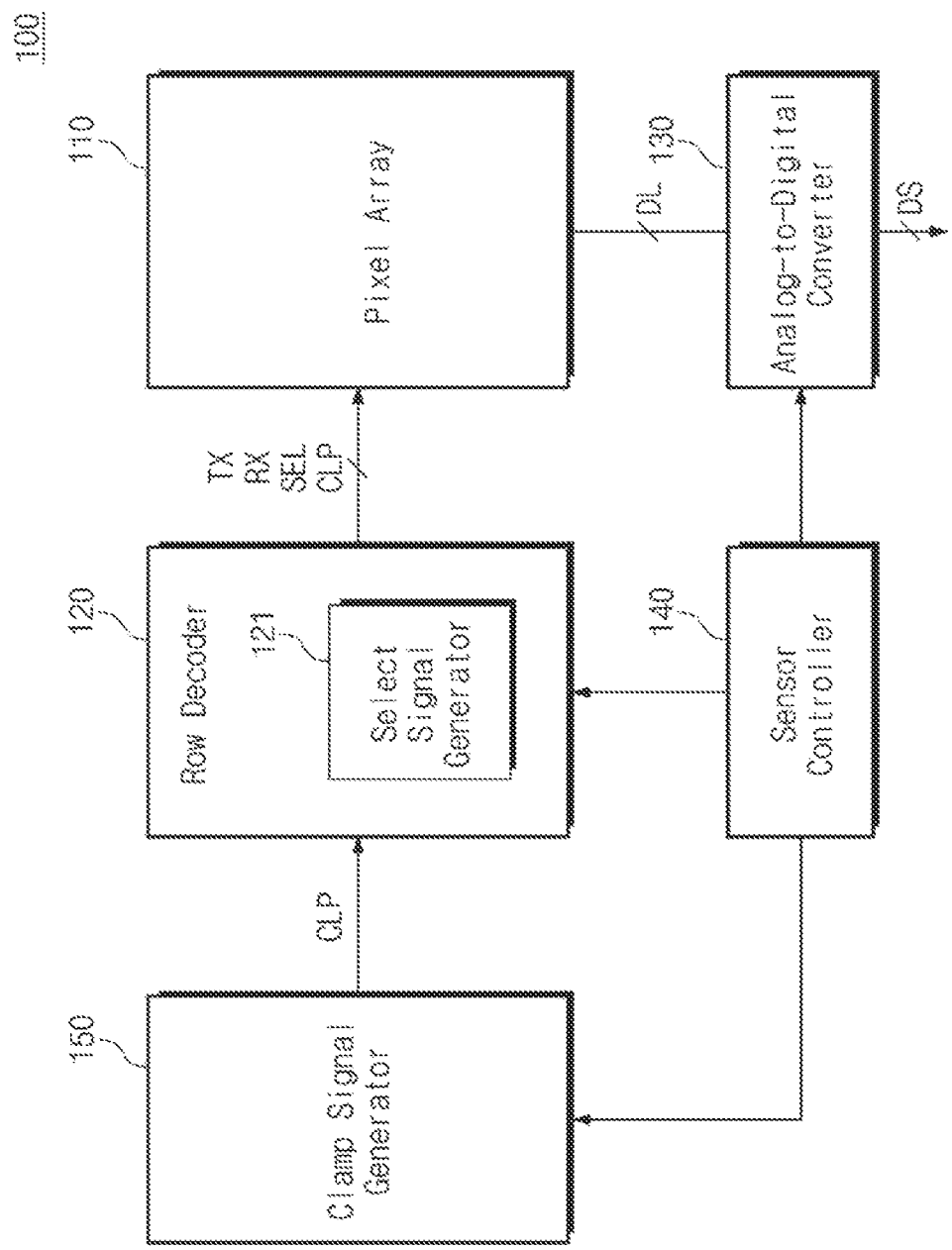
FIG. 1 is a block diagram illustrating an image sensor device, according to an embodiment.

FIG. 1 is a block diagram illustrating an image sensor device, according to an embodiment. Referring to FIG. 1, an image sensor device 100 may include a pixel array 110, a row decoder 120, an analog-to-digital converter 130, a sensor controller 140, and a clamp signal generator 150.

The pixel array 110 may include a plurality of image pixels arranged in a row direction and a column direction. Each of the image pixels may generate a pixel output voltage under the control of the row decoder 120. For example, each of the image pixels may generate a reset voltage or a data voltage. Each of the image pixels may output the generated pixel output voltage to data lines DL.

The row decoder 120 may be connected to the pixel array 110 through a plurality of signal lines. The row decoder 120 may provide a transfer signal TX and a reset signal RX to each of the image pixels through the plurality of signal lines.

The clamp signal generator 150 may generate a clamp signal CLP. The clamp signal generator 150 may provide the clamp signal CLP to the row decoder 120.

The row decoder 120 may provide a select signal SEL or the clamp signal CLP to the image pixels through the signal lines, respectively. For example, the row decoder 120 may include a select signal generator 121. The select signal generator 121 may generate the select signal SEL. The row decoder 120 may receive the clamp signal from the clamp signal generator 150. The row decoder 120 may provide the select signal SEL or the clamp signal CLP for each row of the pixel array 110.

For convenience of description, hereinafter, it is described that the clamp signal generator 150 is a component positioned outside the row decoder 120 and the select signal generator 121 is a component inside the row decoder 120, but the scope of the present disclosure is not limited thereto. For example, in some embodiments, the clamp signal generator 150 may be an internal component of the row decoder 120. In some embodiments, at least one of the clamp signal generator 150 and the select signal generator 121 may be included in a voltage generation block (not shown) positioned outside the row decoder 120.

In an embodiment, each of the image pixels receiving the clamp signal CLP may generate a clamp voltage. Each of the image pixels may provide the generated clamp voltage to the corresponding data line.

The analog-to-digital converter 130 may be connected to the pixel array 110 through the data lines DL. The analog-to-digital converter 130 may convert a voltage (e.g., a pixel output voltage), which is provided through the data line DL, into a digital signal DS. That is, the analog-to-digital converter 130 may sample a voltage level (e.g., an analog voltage) of the data line DL and may convert the voltage level of the data line DL into the digital signal DS. For example, the analog-to-digital converter 130 may perform a sampling operation on a reset voltage and a data voltage, which are provided through the data line DL, and may output the digital signal DS based on a difference between the sampled values.

In an embodiment, the pixel output voltage and the clamp voltage may be provided to the data lines DL at an identical time. In this case, a voltage level of each of the data lines DL may be determined as the higher level value among the voltage level of the pixel output voltage and the voltage level of the clamp voltage. That is, the voltage level of each of the data lines DL may be determined in a winner-takes-all (WTA) method. Accordingly, the voltage level delivered to the analog-to-digital converter 130 through the data lines DL may be prevented from being excessively reduced. As a result, a voltage fluctuation in the data line DL may be minimized.

In an embodiment, when the voltage fluctuation in the data line DL is minimized, noise of an image (e.g., data generated based on the digital signal DS) generated by the image sensor device 100 may be reduced. The noise according to an embodiment will be described in detail with reference to FIGS. 4A to 4B and 5A to 5B below.

The analog-to-digital converter 130 may operate based on illumination. In more detail, an analog gain (in more detail, an analog gain of a ramp generator included in the analog-to-digital converter 130) of the analog-to-digital converter 130 may be changed based on illumination. Accordingly, the analog-to-digital converter 130 may operate based on an analog gain value that varies depending on illumination. For example, when the image sensor device 100 is exposed to a high illumination environment (e.g., sunlight, or the like), the analog-to-digital converter 130 may operate based on a low analog gain value. On the other hand, when the image sensor device 100 operates in a low illumination environment (e.g., a dark room), the analog-to-digital converter 130 may operate based on a high analog gain value. An operation of the analog-to-digital converter 130 according to an analog gain value will be described in detail with reference to FIGS. 2 and 13 below.

The sensor controller 140 may control overall operations of the image sensor device 100. For example, the sensor controller 140 may control the image sensor device 100 to generate the digital signal DS by controlling the row decoder 120, the analog-to-digital converter 130, and the clamp signal generator 150.

In an embodiment, the clamp signal CLP may be generated based on the analog gain value. For example, the sensor controller 140 may set the analog gain value of the analog-to-digital converter 130 based on the illumination of an environment in which the image sensor device 100 operates. Moreover, the sensor controller 140 may allow the clamp signal generator 150 to generate the clamp signal CLP corresponding to the set analog gain value. In this case, the clamp signal generator 150 may generate the clamp signal CLP depending on the analog gain value. That is, the clamp signal generator 150 may generate the clamp signal CLP depending on the illumination of the environment in which the image sensor device 100 operates. Accordingly, the voltage level of the clamp signal CLP may be determined differently depending on the analog gain value of the analog-to-digital converter 130 or the illumination of the environment in which the image sensor device 100 operates.

In an embodiment, the image sensor device 100 may include an illumination sensor (not shown). In this case, the sensor controller 140 may adjust an analog gain value of the analog-to-digital converter 130 based on illumination data received from the illumination sensor. However, embodiments are not limited thereto. For example, in some embodiments, the sensor controller 140 may adjust an analog gain value of the analog-to-digital converter 130 based on illumination data measured from an illumination sensor (not shown) positioned outside the image sensor device 100.

Figure 2:
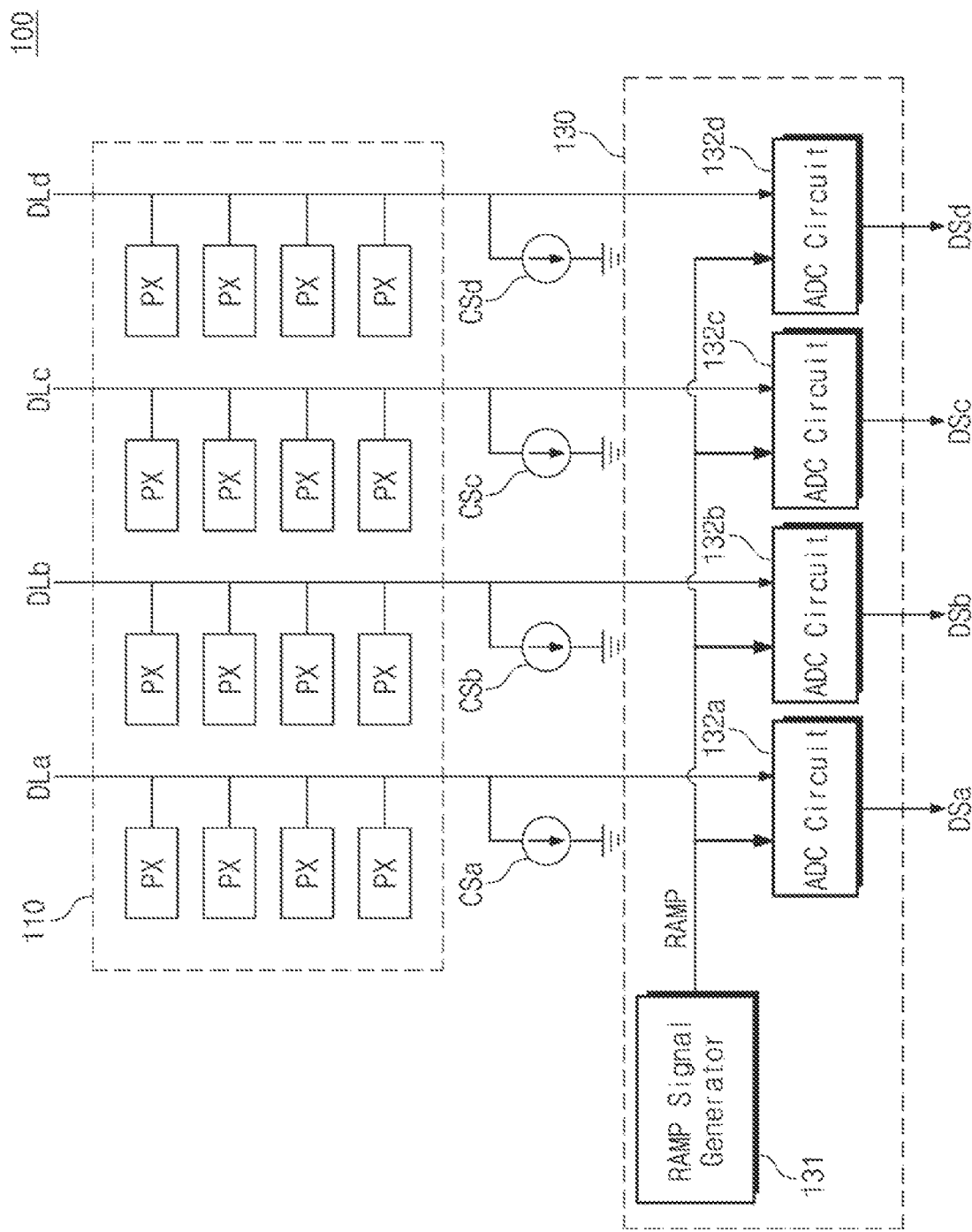
FIG. 2 is a block diagram illustrating a partial configuration of the image sensor device of FIG. 1 in detail, according to an embodiment.

FIG. 2 is a block diagram illustrating a partial configuration of the image sensor device of FIG. 1 in detail, according to an embodiment. For brevity of illustration and for convenience of description, a partial configuration of the image sensor device 100 is illustrated, but embodiments are not limited thereto. Also, an example is illustrated as a plurality of image pixels PX of the pixel array 110 are arranged in a 4×4 matrix, but the scope of the present disclosure is not limited thereto. For example, the image pixels PX of the pixel array 110 may extend in a row direction or a column direction. Accordingly, the pixel array 110 may further include more image pixels that is illustrated in the example of FIG. 2.

In an embodiment, the pixel array 110 may include various shapes of color filter arrays. For example, the pixel array 110 may include a color filter array configured to allow each image pixel to receive a light signal corresponding to a given color.

In an embodiment, the color filter array may include at least one of various color filter array patterns such as a Bayer pattern, an RGBE pattern, a CYYM pattern, a CYGM pattern, a BGBW Bayer pattern, a BGBW pattern, and a tetra pattern.

Continuing to refer to FIGS. 1 and 2, the image sensor device 100 may include the pixel array 110 and the analog-to-digital converter 130. The pixel array 110 may include the image pixels PX. Image pixels placed at a first column from among the image pixels PX may be connected with a first data line DLa, image pixels placed at a second column from among the image pixels PX may be connected with a second data line DLb, image pixels placed at a third column from among the image pixels PX may be connected with a third data line DLc, and image pixels placed at a fourth column from among the image pixels PX may be connected with a fourth data line DLd.

In an embodiment, image pixels included in an identical row in the pixel array 110 may be connected to the row decoder 120 through the same signal line. That is, image pixels included in the same row may share signal lines. Accordingly, image pixels included in the same row may receive the same signal from the row decoder 120. For example, the image pixels included in the first row may receive the same reset signal RX, the same transfer signal TX, and the same select signal SEL.

In an embodiment, the row decoder 120 may provide the select signal SEL or the clamp signal CLP for each row of the pixel array 110. For example, the row decoder 120 may provide the select signal SEL to a first row of the pixel array 110, and may provide the clamp signal CLP to a second row of the pixel array 110. In another example, the row decoder 120 may provide the clamp signal CLP to the first row of the pixel array 110, and may provide the select signal SEL to a second row of the pixel array 110. For example, the row decoder 120 may provide the select signal SEL to a row of image pixels in which a read-out operation is to be performed, and may provide the clamp signal CLP to a row of image pixels in which a clamping operation is to be performed. Operations of image pixels operating based on the select signal SEL and the clamp signal CLP will be described in detail with reference to FIGS. 6 to 10 below.

Each of the image pixels PX may provide a pixel output voltage or a clamp voltage to a data line connected thereto. For example, each of the image pixels receiving the select signal SEL may provide the pixel output voltage to the connected data line. In addition, each of the image pixels receiving the clamp signal CLP may provide the clamp voltage to the connected data line. In this case, a voltage level of each of the first to fourth data lines DLa to DLd may be determined based on voltage levels of the provided clamp voltage and the provided pixel output voltage. A method in which a voltage level of a data line is determined based on voltage levels of a clamp voltage and a pixel output voltage is described above with reference to FIG. 1, and thus a detailed description thereof will be omitted to avoid redundancy.

In an embodiment, the respective pixel output voltage that is output by a row of image pixels, each of which receives the select signal SEL, may be a reset voltage generated through a reset operation or a data voltage generated through a transfer operation.

The first to fourth data lines DLa to DLd may be connected to a first current source CSa, a second current source CSb, a third current source CSc, and a fourth current sources CSa to CSd, respectively. Each of the first to fourth current sources CSa to CSd may be a constant current source.

In an embodiment, each of the first to fourth current sources CSa to CSd may include an N-channel metal oxide semiconductor (NMOS) transistor. However, the scope of the present disclosure is not limited to a method in which the first to fourth current sources CSa to CSd are implemented.

In an embodiment, a current swing may occur in a current source (e.g., some of the first to fourth current sources CSa to CSd) connected to an image pixel exposed to a bright light source. For example, a current value of a current source connected to the image pixel exposed to a bright light source through a data line may increase or decrease temporarily. The current swing that occurs when an image pixel is exposed to a bright light source will be described in detail with reference to FIGS. 5A and 5B below.

The analog-to-digital converter 130 may include a ramp signal generator 131 and a first analog-to-digital converter (ADC) circuit 132a, a second ADC circuit 132b, a third ADC circuit 132c, and a fourth ADC circuit 132d.

The ramp signal generator 131 may generate a ramp signal RAMP. The ramp signal generator 131 may provide the ramp signal RAMP to the first to fourth ADC circuits 132a to 132d.

In an embodiment, the ramp signal RAMP may be a signal, of which a voltage level increases or decreases linearly (or non-linearly) during a specific time. In other words, the ramp signal RAMP may be a signal, of which a voltage level increases or decreases depending on a slope based on an analog gain value. The slope may be predetermined. The ramp signal generator 131 may generate the ramp signal RAMP depending on values (e.g., a voltage level at a start time point, a voltage level at an end time point, an analog gain, a saturation voltage, or the like). The values may be predetermined. Hereinafter, the ramp signal RAMP, which decreases linearly during a specific time, will be mainly described.

In an embodiment, a slope at which a voltage level of the ramp signal RAMP decreases may be determined based on various factors such as an analog gain value of the analog-to-digital converter 130, a saturation voltage of the analog-to-digital converter 130, or the like. That is, a voltage level at a point in time when the voltage level of the ramp signal starts to decrease, and a voltage level at a point in time when the voltage level of the ramp signal RAMP stops decreasing may be determined based on various factors such as the analog gain value of the analog-to-digital converter 130, the saturation voltage of the analog-to-digital converter 130, or the like. For example, as the analog gain value of the analog-to-digital converter 130 decreases, a slope (i.e., an absolute value of the slope) of the ramp signal RAMP may be determined to increase. Moreover, as the saturation voltage of the analog-to-digital converter 130 increases, the slope (i.e., the absolute value of the slope) of the ramp signal RAMP may be determined to increase.

In an embodiment, the saturation voltage of the analog-to-digital converter 130 may refer to a potential difference between a reset voltage and a data voltage, which is required for the analog-to-digital converter 130 to generate the digital signal DS having a maximum value when the analog gain value is '1'. The ramp signal RAMP and an operation of the image sensor device 100 according to the analog gain value and the saturation voltage will be described in detail with reference to FIGS. 12A, 12B, and 13 below.

The first to fourth ADC circuits 132a to 132d may be connected to the first to fourth data lines DLa to DLd, respectively. The first to fourth ADC circuits 132a to 132d may respectively output first to fourth digital signals DSa to DSd by comparing the voltage level of the connected data line with the voltage level of the ramp signal RAMP. That is, the ramp signal RAMP may be used as a reference voltage for each of the data lines DLa to DLd. For example, the first ADC circuit 132a may output the first digital signal DSa by comparing a voltage level of the first data line DLa with a voltage level of the ramp signal RAMP. A configuration of the ramp signal generator 131 and an operation of an ADC circuit will be described in detail with reference to FIGS. 12A to 12B and 13 below.

Figure 3:
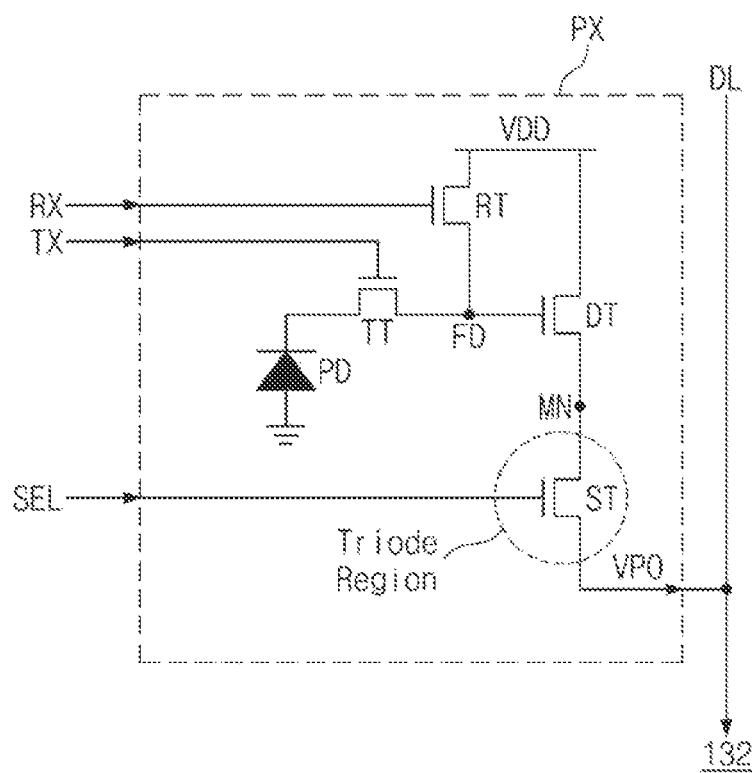
FIG. 3 is a circuit diagram illustrating, in detail, the image pixel of FIG. 2 operating in response to a select signal, according to an embodiment.

FIG. 3 is a circuit diagram illustrating a configuration of the image pixel of FIG. 2, which operates in response to a select signal, according to an embodiment. Hereinafter, an image pixel of a 4TR-1PD (i.e., 4-transistor and 1-photodiode) structure is described with reference to FIG. 3. However, the scope of the present disclosure is not limited thereto. For example, each of the image pixels PX included in the pixel array 110 may be implemented in various forms such as a 5TR-2PD (i.e., 5-transistor and 2-photodiode) structure, a 6TR-3PD (i.e., 6-transistor and 3-photodiode) structure, or the like.

Referring to FIGS. 1 to 3, the image pixel PX may output a pixel output voltage VPO through the data line DL in response to the reset signal RX, the transfer signal TX, and the select signal SEL, which are received from the row decoder 120.

For example, the image pixel PX may include a photodiode PD, a transfer transistor TT, a reset transistor RT, a drive transistor DT, and a select transistor ST. The photodiode PD may accumulate charges (i.e., convert photons into electrons) in response to an optical signal received from the outside.

The transfer transistor TT may be connected between the photodiode PD and a floating diffusion node FD. The transfer transistor TT may operate in response to the transfer signal TX from the row decoder 120. For example, the transfer transistor TT may be turned on in response to the transfer signal TX of logic high (hereinafter, it may be referred to as a "first voltage level"). In this case, charges may move from the photodiode PD to the floating diffusion node FD, and thus a voltage at the floating diffusion node FD may be lowered.

The reset transistor RT may be connected between a power supply voltage VDD and the floating diffusion node FD. The reset transistor RT may operate in response to the reset signal RX from the row decoder 120. For example, the reset transistor RT may be turned on in response to the reset signal RX of logic high (hereinafter, referred to as a "second voltage level"). In this case, the floating diffusion node FD may be charged to the power supply voltage VDD.

The drive transistor DT may be connected between the power supply voltage VDD and a middle node MN. The drive transistor DT may operate in response to the voltage at the floating diffusion node FD. For example, the gate terminal of the drive transistor DT may be connected to the floating diffusion node FD. In this case, the drive transistor DT may deliver a voltage corresponding to a variation in the voltage at the floating diffusion node FD to the select transistor ST via the middle node MN. That is, the drive transistor DT may operate as a source follower of which an input terminal is connected to the floating diffusion node FD.

In an embodiment, an operation of charging the floating diffusion node FD to a power supply voltage may be referred to as a "reset operation".

In an embodiment, an operation of reducing the voltage at the floating diffusion node FD by transmitting charges from the photodiode PD to the floating diffusion node FD may be referred to as a "transfer operation".

In an embodiment, a voltage output by the drive transistor DT based on the voltage at the floating diffusion node FD charged to the power supply voltage through the reset operation may be referred to as a "reset voltage".

In an embodiment, the voltage output by the drive transistor DT based on the voltage at the floating diffusion node FD reduced through the transfer operation may be referred to as a "data voltage".

The select transistor ST may be connected between the middle node MN and the data line DL. The select transistor ST may perform a switching operation in response to the select signal SEL from the row decoder 120. For example, when the select signal SEL is logic high (i.e., the second voltage level), the select transistor ST may operate in a triode region. Accordingly, the select transistor ST may deliver, to the data line DL, a signal (i.e., a voltage corresponding to the variation in the voltage at the floating diffusion node FD) from the drive transistor DT in response to the select signal SEL of logic high. That is, the select transistor ST may provide the pixel output voltage VPO to the data line DL in response to the select signal SEL of logic high. In this case, the pixel output voltage VPO may be a reset voltage or a data voltage.

In an embodiment, an operation of generating the reset voltage and the data voltage and outputting the generated reset voltage and the generated data voltage through the data line DL under the control of the select signal SEL may be referred to as a "read-out operation".

In an embodiment, when a value obtained by subtracting a voltage at a source terminal of the select transistor ST from a voltage at a gate terminal of the select transistor ST is greater than a threshold voltage of the select transistor ST, and a voltage at a drain terminal of the select transistor ST is less than a value obtained by subtracting the threshold voltage of the select transistor ST from the voltage at the gate terminal of the select transistor ST, it may be determined that the select transistor ST operates in the triode region.

Hereinafter, for convenience of description, a voltage level of a signal of logic low may be referred to as a "first voltage level", a voltage level of a signal of logic high may be referred to as a "second voltage level", a signal that is logic low may be referred to as the signal in an inactive state, and a signal (e.g., a signal of which a voltage level is higher than the first voltage level) that is not logic low may be referred to as the signal in an active state.

In an embodiment, the first voltage level may be a level of a ground voltage, and the second voltage level may be a level of the power supply voltage VDD.

Figure 4A:
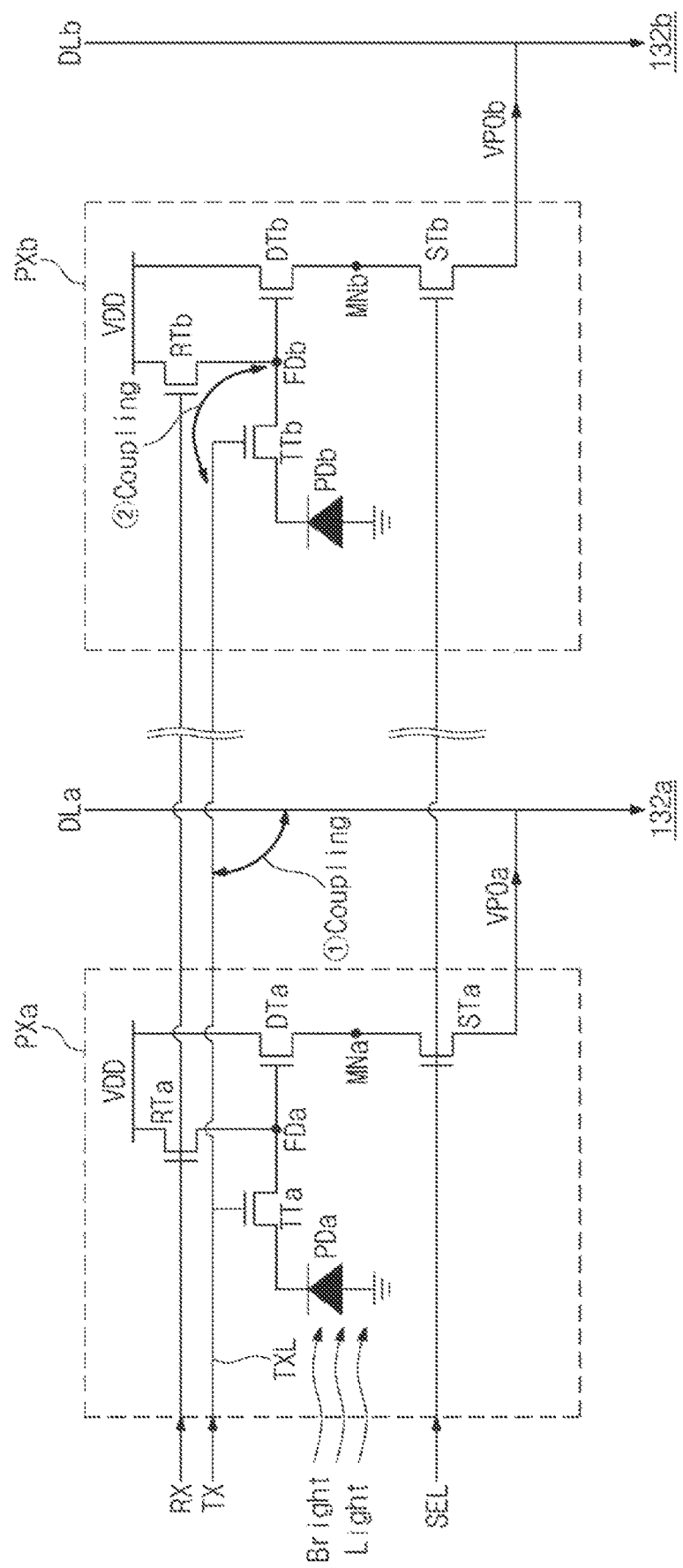
FIGS. 4A and 4B are diagrams for describing noise generated in the image sensor device of FIG. 2.
Figure 4B:
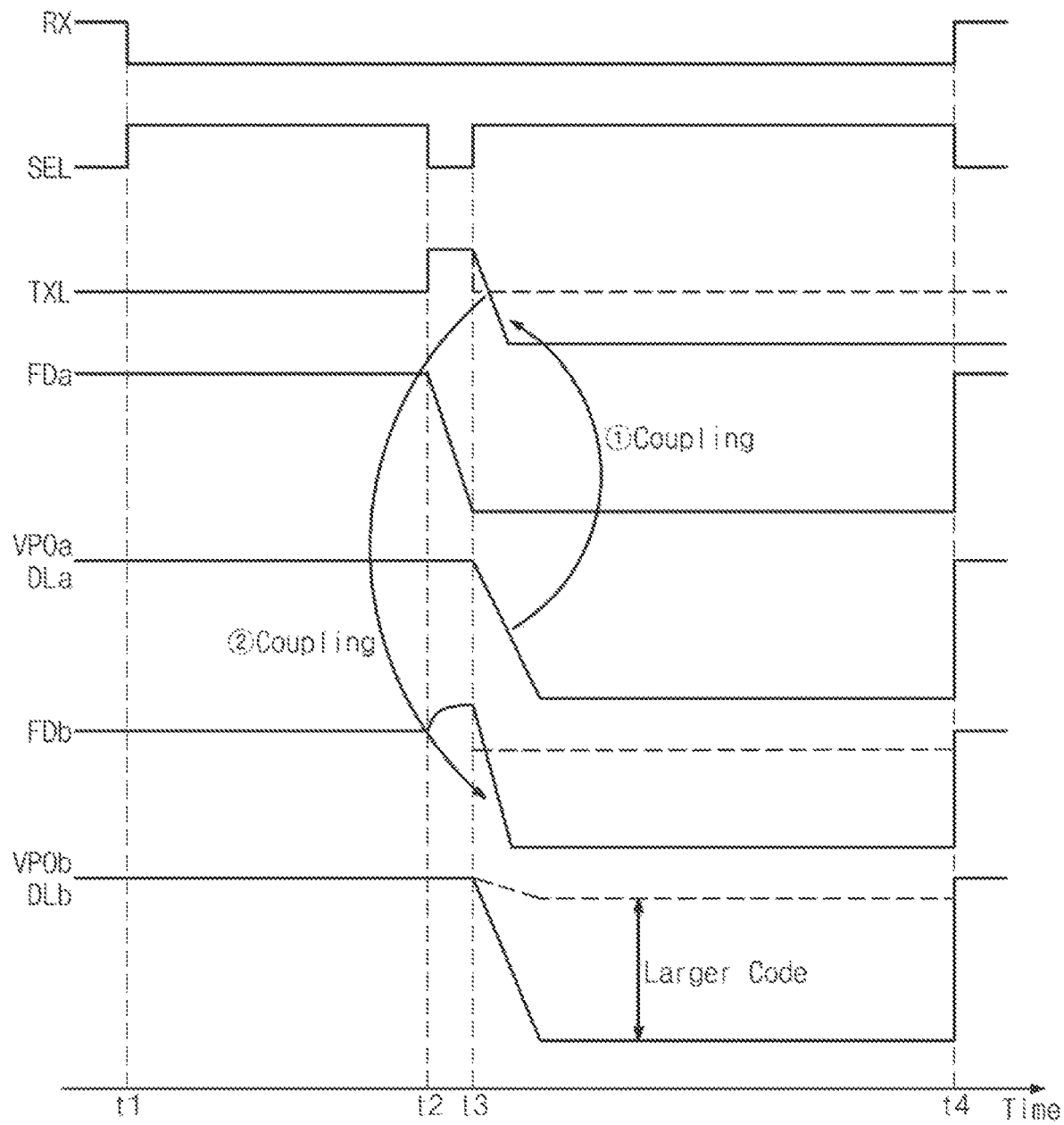

FIGS. 4A and 4B are diagrams for describing noise generated in the image sensor device of FIG. 2. Hereinafter, noise in the case where a clamping operation is not performed according to an embodiment will be described with reference to FIGS. 4A and 4B, but the scope of the present disclosure is not limited thereto.

Referring to FIGS. 1 to 4A, the pixel array 110 may include a first image pixel PXa and a second image pixel PXb. The first image pixel PXa and the second image pixel PXb may be arranged in the same row of the pixel array 110 and may be arranged in different columns. For example, the first image pixel PXa and the second image pixel PXb may share the same signal lines (e.g., a select signal line TXL or the like) and may receive the same reset signal RX, the same transfer signal TX, and the same select signal SEL. Hereinafter, for convenience of description, it is assumed that the first image pixel PXa is an image pixel positioned in the first row and the first column of the pixel array 110 of FIG. 2 and the second image pixel PXb is an image pixel positioned in the first row and the second column of the pixel array 110 of FIG. 2. However, the scope of the present disclosure is not limited thereto.

The first image pixel PXa may include a first photodiode PDa, a first transfer transistor TTa, a first floating diffusion node FDa, a first reset transistor RTa, a first drive transistor DTa, a first middle node MNa, and a first select transistor STa. The second image pixel PXb may include a second photodiode PDb, a second transfer transistor TTb, a second floating diffusion node FDb, a second reset transistor RTb, a second drive transistor DTb, a second middle node MNb, and a second select transistor STb. The first image pixel PXa and the second image pixel PXb may be respectively connected to the first data line DLa and the second data line DLb. The first data line DLa and the second data line DLb may be connected to the first ADC circuit 132a and the second ADC circuit 132b, respectively. A configuration and operation of each of the first image pixel PXa and the second image pixel PXb are similar to those described above with reference to FIG. 3, and thus a detailed description thereof will be omitted to avoid redundancy.

In an embodiment, the first image pixel PXa may be exposed to a bright light source (e.g., sunlight or the like). In this case, the first photodiode PDa may accumulate (i.e., convert photons into electrons) a large amount of charges by receiving bright light. Afterward, when a transfer signal TX becomes logic high, a large amount of charges may flow into the first floating diffusion node FDa, and thus the voltage at the first floating diffusion node FDa may be greatly reduced.

Afterward, when the select signal SEL becomes logic high, a level of a voltage generated based on a voltage (e.g., a data voltage or a first pixel output voltage VPOa) at the first floating diffusion node FDa may be greatly reduced. When a voltage level of the first pixel output voltage VPOa decreases rapidly, the voltage level of the first data line DLa may be rapidly reduced. In this case, a voltage level of a transfer signal line TXL may decrease due to a coupling phenomenon (①coupling). For example, the voltage level of the transfer signal line TXL may be lower than the second voltage level.

When the voltage level of the transfer signal line TXL decreases, a coupling phenomenon (②coupling) may occur between the transfer signal line TXL and another pixel (e.g., the second image pixel PXb) connected to the transfer signal line TXL. For example, when the voltage level of the transfer signal line TXL decreases, the voltage at the second floating diffusion node FDb may decrease. In this case, because a voltage level of a second pixel output voltage VPOb is determined based on a voltage at the second floating diffusion node FDb, the voltage level of the second pixel output voltage VPOb may be unintentionally reduced.

In an embodiment, when the voltage level of the second pixel output voltage VPOb is unintentionally reduced, a value of a second digital signal DSb generated by the second ADC circuit 132b may increase. In this case, an error may occur in image data generated by the image sensor device 100.

FIG. 4B is a timing diagram illustrating a coupling phenomenon of FIG. 4A in detail. Referring to FIGS. 1 to 4B, in a time interval before a first time point t1, a reset operation may be performed on the first image pixel PXa and the second image pixel PXb. For example, before the first time point t1, the reset signal RX may be logic high, and the select signal SEL may be logic low. In this case, the first and second reset transistors RTa and RTb may be turned on in response to the reset signal RX, and voltage levels at the first and second floating diffusion nodes FDa and FDb may increase based on the power supply voltage VDD (in detail, a value obtained by subtracting the threshold voltage of the first or second reset transistor RTa or RTb from the power supply voltage VDD).

In a time interval between the first time point t1 and a second time point t2, the analog-to-digital converter 130 may perform a reset sampling operation. For example, in the time interval between the first time point t1 and the second time point t2, the reset signal RX may be logic low, and the select signal SEL may be logic high. Each of the first image pixel PXa and the second image pixel PXb may provide a pixel output voltage to the corresponding data line in response to the select signal SEL of logic high. In this case, the pixel output voltage provided by each of the first image pixel PXa and the second image pixel PXb to a data line may be a reset voltage. The first ADC circuit 132a and the second ADC circuit 132b may sample voltage levels (i.e., a voltage level of a reset voltage) of the first data line DLa and the second data line DLb, respectively.

In a time interval between the second time point t2 and a third time point t3, a transfer operation may be performed on the first image pixel PXa and the second image pixel PXb. For example, in a time interval between the second time point t2 and the third time point t3, the transfer signal TX may be logic high, and the select signal SEL may be logic low. The voltage level of the transfer signal line TXL may correspond to logic high (e.g., a second voltage level) depending on a voltage level of the transfer signal TX. In this case, a voltage level (i.e., a voltage level at the first floating diffusion node FDa) of the floating diffusion node of a pixel (i.e., the first image pixel PXa) exposed to a bright light source may decrease rapidly. On the other hand, a voltage level (i.e., a voltage level of the second floating diffusion node FDb) of the floating diffusion node of a pixel (i.e., the second image pixel PXb) that is not exposed to a bright light source (or operating in a dark environment) may not decrease.

In an embodiment, in the time interval between the second time point t2 and the third time point t3, the voltage level of the second floating diffusion node FDb may be increased by the coupling with the transfer signal line TXL. However, the scope of the present disclosure is not limited thereto. For example, regardless of whether coupling between the second floating diffusion node FDb and the transfer signal line TXL occurs, the technical idea of the present disclosure to be described may be applied.

In a time interval between the third time point t3 and a fourth time point t4, the analog-to-digital converter 130 may perform a data sampling operation. For example, in the time interval between the third time point t3 and the fourth time point t4, the transfer signal TX may be logic low, and the select signal SEL may be logic high. Each of the first image pixel PXa and the second image pixel PXb may provide a pixel output voltage to the corresponding data line in response to the select signal SEL of logic high. In this case, the pixel output voltage provided by each of the first image pixel PXa and the second image pixel PXb to a data line may be a data voltage.

In the time interval between the third time point t3 and the fourth time point t4, the level of the first pixel output voltage VPOa may be rapidly reduced. Accordingly, the voltage level of the first data line DLa may rapidly decrease. In this case, a voltage level of the transfer signal line TXL may decrease due to a coupling phenomenon (① coupling). That is, after the second time point t2, the voltage level of the transfer signal line TXL may decrease to a 0-th voltage level lower than a first voltage level (i.e., a voltage level having logic low).

When the voltage level of the transfer signal line TXL decreases to the 0-th voltage level, the voltage at the second floating diffusion node FDb may be reduced due to a coupling phenomenon (② coupling) between the transfer signal line TXL and the second floating diffusion node FDb. In this case, the voltage level of the second pixel output voltage VPOb may be unintentionally reduced, and thus the voltage level of the second data line DLb may decrease. Accordingly, the second ADC circuit 132b connected to the second data line DLb may perform a data sampling operation based on a data line voltage lower than that in an ideal operation. Accordingly, the second ADC circuit 132b may generate the second digital signal DSb having a value greater than that in the ideal operation.

After the fourth time point t4, the row decoder 120 may perform a reset operation on the first image pixel PXa and the second image pixel PXb. In this case, the first floating diffusion node FDa and the second floating diffusion node FDb may be charged with the power supply voltage VDD.

FIGS. 4A and 4B illustrate that one image pixel is exposed to a bright light source, and an error occurs in another image pixel, but the scope of the present disclosure is not limited thereto. For example, an error similar thereto may occur in other image pixels positioned in the same row as an image pixel exposed to a bright light source. That is, the other image pixels positioned in the same row as the image pixel exposed to the bright light source may output a pixel output voltage having a voltage level lower than an intended voltage level. Accordingly, when an image is generated through the digital signals DS generated by the analog-to-digital converter 130, noise formed in a row direction may be detected. Hereinafter, for convenience of description, a phenomenon (i.e., a phenomenon that a digital signal having a high value is generated) that a pixel output voltage having a voltage level lower than the intended voltage level is generated, which is described with reference to FIGS. 4A and 4B, is referred to as a positive smear-like-horizontal-band-noise (SHBN).

Figure 5A:
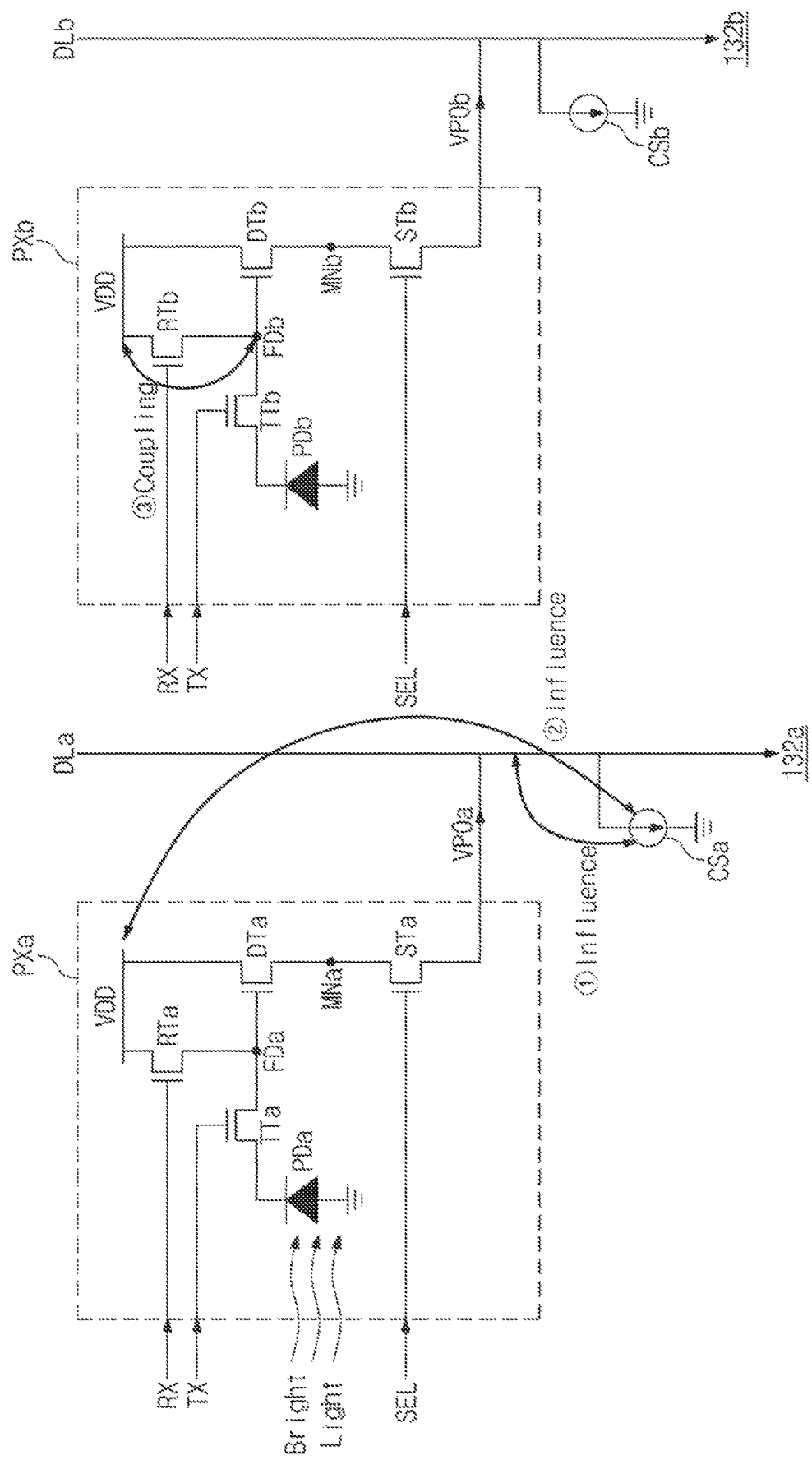
FIGS. 5A and 5B are diagrams for describing noise generated in the image sensor device of FIG. 2.
Figure 5B:
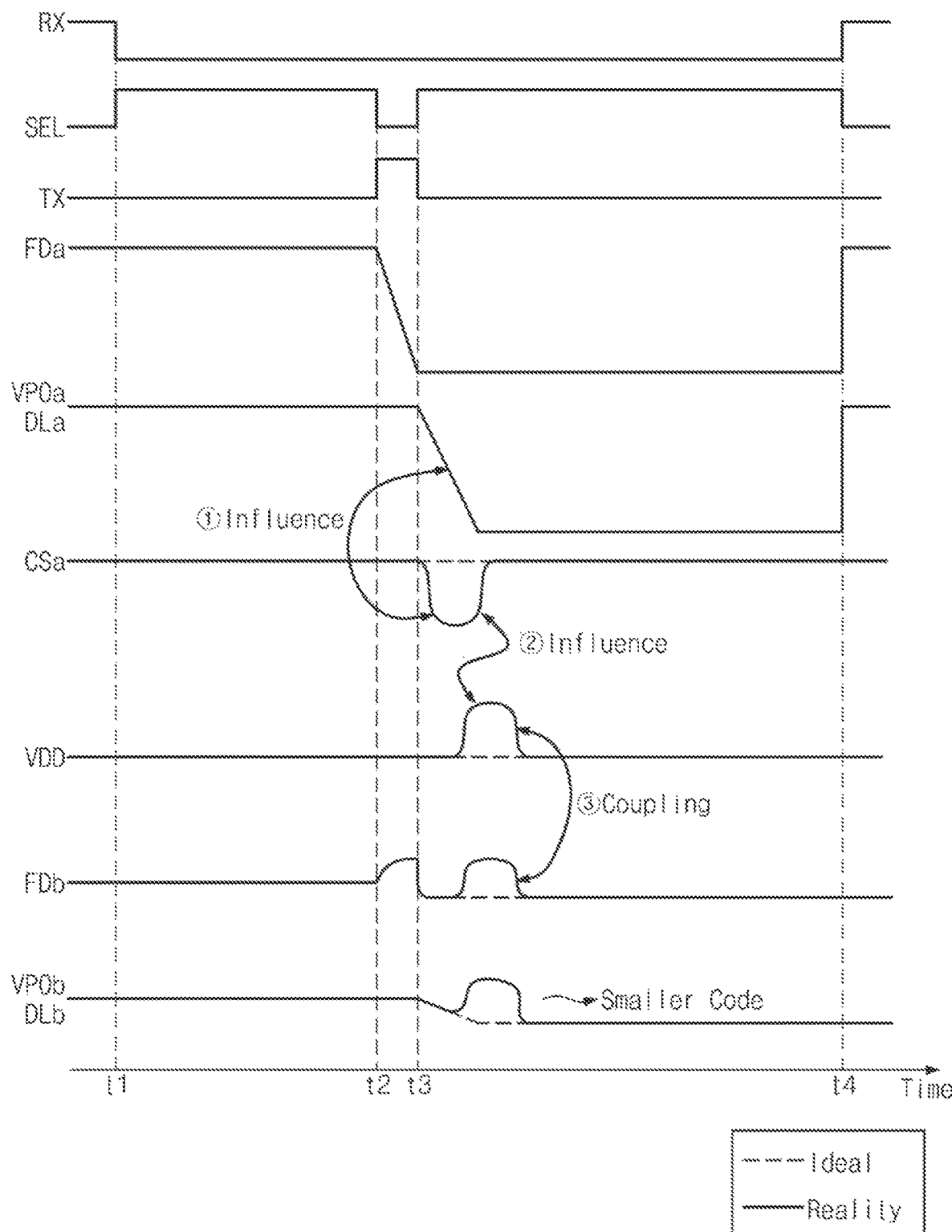

FIGS. 5A and 5B are diagrams for describing noise generated in the image sensor device of FIG. 2. Hereinafter, noise in the case where a clamping operation is not performed according to an embodiment of the present disclosure will be described with reference to FIGS. 5A and 5B, but the scope of the present disclosure is not limited thereto.

Referring to FIGS. 1 to 5A, the pixel array 110 may include the first image pixel PXa and the second image pixel PXb. The first image pixel PXa and the second image pixel PXb may be arranged in the same row of the pixel array 110 and may be arranged in different columns. That is, as in the description given with reference to FIG. 4A, the first image pixel PXa and the second image pixel PXb may share the same signal lines and may receive the same reset signal RX, the same transfer signal TX, and the same select signal SEL. A configuration and operation of each of the first image pixel PXa and the second image pixel PXb are similar to those described above with reference to FIG. 4A, and thus a detailed description thereof will be omitted to avoid redundancy.

The first image pixel PXa and the second image pixel PXb may be respectively connected to the first data line DLa and the second data line DLb. The first data line DLa and the second data line DLb may be connected to the first ADC circuit 132a and the second ADC circuit 132b, respectively. The first current source CSa and the second current source CSb may be respectively connected to the first data line DLa and the second data line DLb.

The first image pixel PXa may be exposed to a bright light source (e.g., sunlight or the like). In this case, a voltage at the first floating diffusion node FDa may be greatly reduced, and a voltage level of the first pixel output voltage VPOa may be rapidly reduced. Accordingly, the voltage level of the first data line DLa may rapidly decrease.

In an embodiment, the first current source CSa may include an NMOS transistor. In this case, a drain terminal of the NMOS transistor of the first current source CSa may be connected to the first data line DLa. A source terminal of the NMOS transistor of the first current source CSa may be connected to a ground voltage. Accordingly, when the voltage level of the first data line DLa is rapidly reduced, a voltage at the drain terminal of the NMOS transistor may be rapidly changed. As a result, an influence (① influence) (e.g., a current value swing) on a current value of the first current source CSa may occur. For example, the amount of current flowing from the first data line DLa to the ground voltage may temporarily decrease and then may recover.

When the current value swing occurs in the first current source CSa, an influence (② influence) (e.g., a power supply voltage swing) on the power supply voltage VDD of the pixel array 110 may occur. For example, when the current value of the first current source CSa increases, a voltage level of a path from the power supply voltage VDD to the first current source CSa via the first drive transistor DTa, the first select transistor STa, and the first data line DLa may increase temporarily. Accordingly, a voltage swing may occur in the power supply voltage VDD of the pixel array 110. That is, when the current value swing occurs in the first current source CSa, the voltage level of the power supply voltage VDD may increase temporarily and then decrease.

When the voltage swing occurs in the power supply voltage VDD of the image sensor device 100, the coupling with the second image pixel PXb may occur. For example, a coupling phenomenon (③ coupling) may occur between the second floating diffusion node FDb and the power supply voltage VDD. In this case, a voltage level of the second floating diffusion node FDb may temporarily increase, and thus the second pixel output voltage VPOb may temporarily increase.

In an embodiment, when the voltage level of the second pixel output voltage VPOb unintentionally increases, a value of the second digital signal DSb generated by the second ADC circuit 132*b* may decrease. In this case, an error may occur in image data generated by the image sensor device 100.

FIG. 5B is a timing diagram illustrating a coupling phenomenon of FIG. 5A in detail. Referring to FIGS. 1 to 5B, in a time interval before the first time point t1, a reset operation may be performed on the first image pixel PXa and the second image pixel PXb. In a time interval between the first time point t1 and the second time point t2, a reset sampling operation may be performed on the first image pixel PXa and the second image pixel PXb. In a time interval between the second time point t2 and the third time point t3, a transfer operation may be performed on the first image pixel PXa and the second image pixel PXb. In a time interval between the third time point t3 and the fourth time point t4, the analog-to-digital converter 130 may perform a data sampling operation. Operations of the first image pixel PXa and the second image pixel PXb in a time interval up to the third time point t3 are similar to those described above with reference to FIGS. 4A and 4B, and thus a detailed description thereof will be omitted to avoid redundancy.

In the time interval between the third time point t3 and the fourth time point t4, the voltage level (i.e., a voltage output from an image pixel exposed to a bright light source) of the first pixel output voltage VPOa may be rapidly decreased. Accordingly, the voltage level of the first data line DLa may rapidly decrease. In this case, a current value swing (①influence) may occur in the first current source CSa connected to the first data line DLa. That is, the amount of current of the first current source CSa may temporarily decrease and then may recover.

When the current value swing occurs in the first current source CSa, a swing (② influence) of the power supply voltage VDD of the pixel array 110 may occur. For example, the power supply voltage VDD may increase temporarily.

When the power supply voltage VDD increases temporarily, a voltage at the second floating diffusion node FDb may increase temporarily due to a coupling phenomenon (③ coupling) between the power supply voltage VDD and the second floating diffusion node FDb. In this case, the voltage level of the second pixel output voltage VPOb may be unintentionally increased, and thus the voltage level of the second data line DLb may increase. Accordingly, the second ADC circuit 132*b* connected to the second data line DLb may perform a data sampling operation based on a data line voltage higher than that in an ideal operation. Accordingly, the second ADC circuit 132*b* may generate the second digital signal DSb having a value smaller than that in the ideal operation.

FIGS. 5A and 5B illustrate that one image pixel is exposed to a bright light source, and an error occurs in another image pixel, but the scope of the present disclosure is not limited thereto. For example, an error similar thereto may occur in other image pixels positioned in the same row as an image pixel exposed to a bright light source. That is, the other image pixels positioned in the same row as the image pixel exposed to the bright light source may output a pixel output voltage having a voltage level higher than an intended voltage level. Accordingly, when an image is generated through the digital signal DS generated by the analog-to-digital converter 130, noise formed in a row direction may be detected. Hereinafter, for convenience of description, a phenomenon (i.e., a phenomenon that a digital signal having a low value is generated) that a pixel output voltage having a voltage level higher than the intended voltage level is generated, which is described with reference to FIGS. 5A and 5B, is referred to as a negative SHBN.

In an embodiment, positive SHBN and negative SHBN may occur at the same time. For example, when bright light is incident onto a specific image pixel, positive SHBN and negative SHBN may occur at the same time. In this case, when an influence of positive SHBN is greater than an influence of negative SHBN, an image including bright noise formed in a row direction may be generated. When an influence of negative SHBN is greater than an influence of positive SHBN, an image including dark noise formed in a row direction may be generated.

Figure 6:
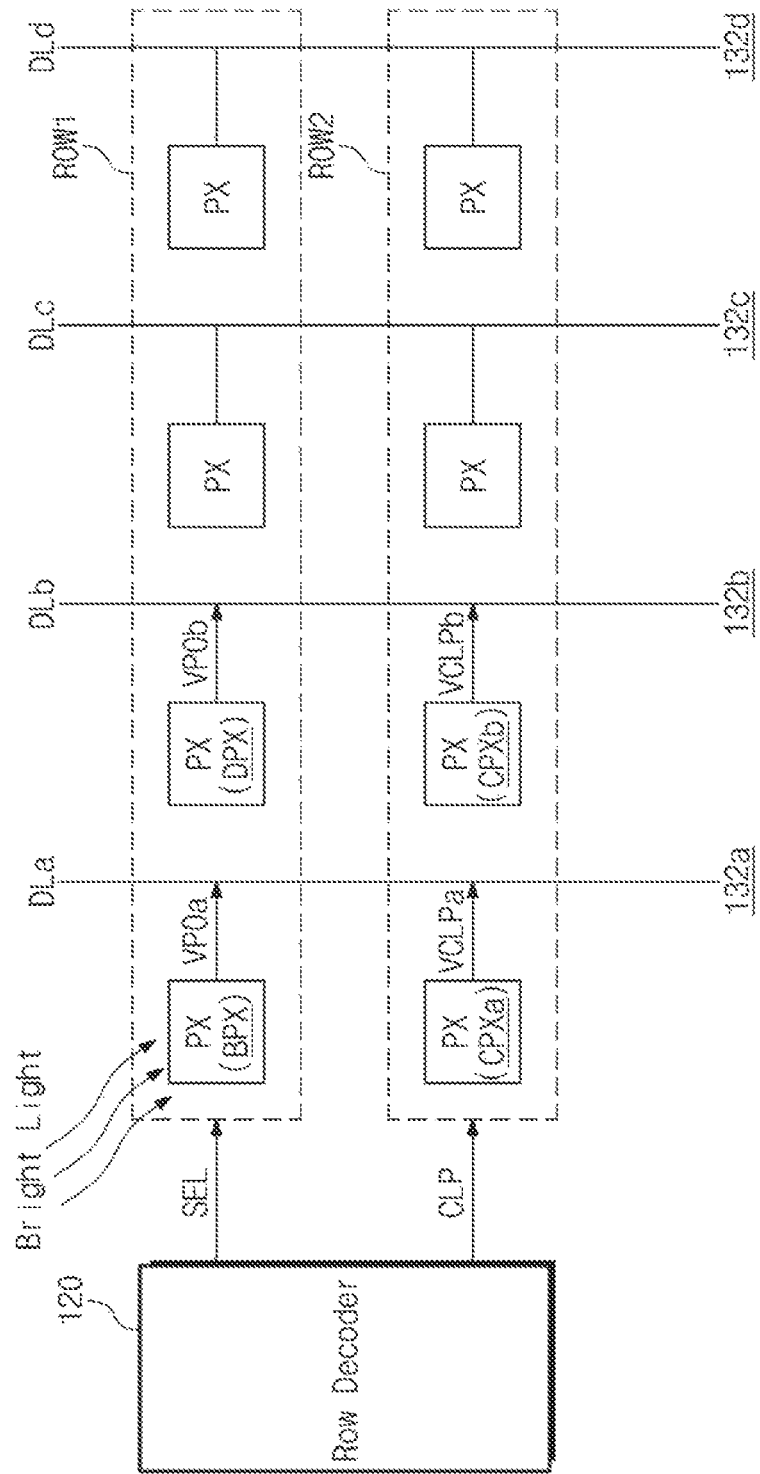
FIG. 6 is a block diagram illustrating a partial configuration of the image sensor device of FIG. 1 in detail, according to an embodiment.

FIG. 6 is a block diagram illustrating a partial configuration of the image sensor device of FIG. 1 in detail, according to an embodiment. Referring to FIGS. 1 to 3 and 6, the row decoder 120 may output the select signal SEL and the clamp signal CLP.

The image sensor device 100 may provide a signal changed for each row of the pixel array 110. For example, the row decoder 120 may provide the select signal SEL to a row of image pixels in which a read-out operation is to be performed, and may provide the clamp signal CLP to a row of image pixels in which a clamping operation is to be performed. Hereinafter, an embodiment in which the row decoder 120 provides the select signal SEL to a first row ROW1 (or image pixels included in a first row) and provides the clamp signal CLP to a second row ROW2 (or image pixels included in a second row) will be mainly described. However, the scope of the present disclosure is not limited thereto. For example, in some embodiments, a select signal may be provided to two or more rows, or a clamp signal may be provided to two or more rows. In some embodiments, for example, the select signal may be provided to the first row ROW1, and the clamp signal CLP may be provided to remaining rows.

The first row ROW1 of image pixels may perform a read-out operation in response to the select signal SEL. In other words, the first row ROW1 of image pixels may generate a reset voltage by performing a reset operation, may output the reset voltage to the corresponding data line, may generate a data voltage by performing a transfer operation, and may output the data voltage to the corresponding data line.

The second row ROW2 of image pixels may perform a clamping operation in response to the clamp signal CLP. That is, the second row ROW2 of image pixels may receive the clamp signal CLP instead of the select signal SEL. Each of image pixels in the second row ROW2 may provide a clamp voltage to the corresponding data line in response to the clamp signal CLP.

Hereinafter, for convenience of description, it is assumed that one of image pixels positioned in the first row ROW1 is exposed to a bright light source. For example, it is assumed that an image pixel BPX positioned (i.e., connected to the first data line DLa) in a first column and the first row ROW1 is exposed to a bright light source. It is assumed that an image pixel DPX positioned (i.e., connected to the second data line DLb) in a second column and the first row ROW1 is not exposed to a bright light source.

The image pixel BPX may provide the first pixel output voltage VPOa to the first data line DLa. The image pixel DPX may provide the second pixel output voltage VPOb to the second data line DLb. An operation of each image pixel in the first row ROW1 is similar to an operation of the image pixel described above with reference to FIG. 3, and thus a more detailed description will be omitted to avoid redundancy.

An image pixel CPXa, which is positioned in the same column as the image pixel BPX, from among image pixels in the second row ROW2 may provide a first clamp voltage VCLPa to the first data line DLa. As in the above description, an image pixel CPXb, which is positioned in the same column as the image pixel DPX, from among image pixels in the second row ROW2 may provide a second clamp voltage VCLPb to the second data line DLb.

In an embodiment, clamp voltages respectively provided from the second row ROW2 of image pixels to data lines may be the same as each other. For example, the first clamp voltage VCLPa may be the same as the second clamp voltage VCLPb. However, the scope of the present disclosure is not limited thereto.

In an embodiment, a voltage level of each of the first to fourth data lines DLa to DLd may be determined based on voltage levels of the provided clamp voltage and the provided pixel output voltage. For example, a voltage level of the first data line DLa may be determined as a level of the higher voltage among the first pixel output voltage VPOa and the first clamp voltage VCLPa. A voltage level of the second data line DLb may be determined as a level of the higher voltage among the second pixel output voltage VPOb and the second clamp voltage VCLPb.

Figure 7:
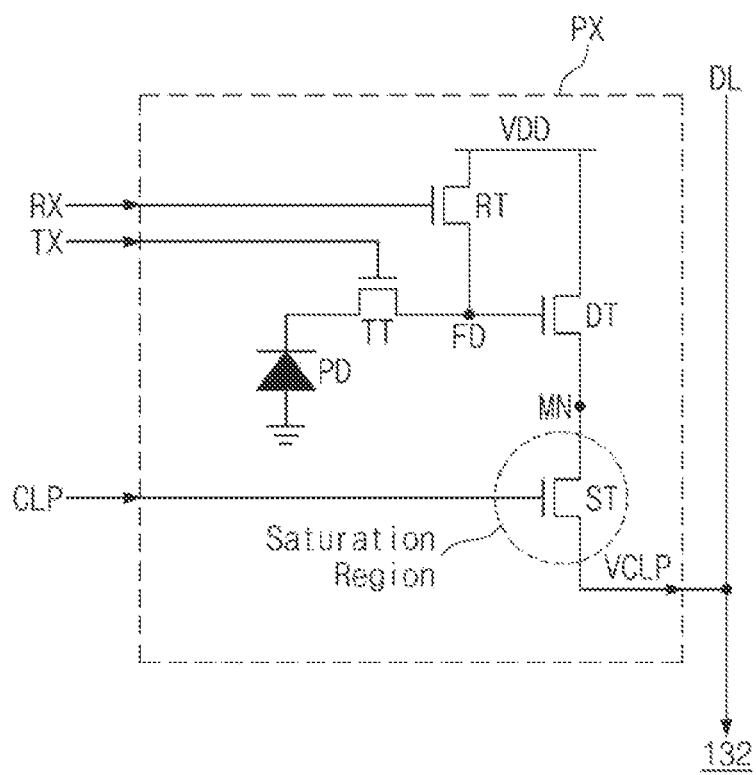
FIG. 7 is a circuit diagram illustrating an image pixel included in the second row of FIG. 6 in detail, according to an embodiment.

FIG. 7 is a circuit diagram illustrating a configuration of an image pixel included in the second row (i.e., the row providing the clamp voltages) of FIG. 6 in detail, according to an embodiment. The image pixel PX included in the second row ROW2 may include the photodiode PD, the transfer transistor TT, the floating diffusion node FD, the reset transistor RT, the drive transistor DT, the middle node MN, and the select transistor ST. That is, a configuration of the image pixel PX included in the second row ROW2 is the same as that described above with reference to FIG. 3, and thus a more detailed description will be omitted to avoid redundancy.

The select transistor ST may operate in response to the clamp signal CLP. The select transistor ST may receive the clamp signal CLP through a gate terminal thereof. The select transistor ST may provide the data line DL with a clamp voltage VCLP corresponding to a voltage at the middle node MN in response to the clamp signal CLP. That is, the select transistor ST may operate as a source follower in response to the clamp signal CLP.

In an embodiment, a voltage level of the clamp signal CLP may be determined based on an analog gain value and a saturation voltage of the analog-to-digital converter 130. For example, when the clamp signal CLP is not activated, the voltage level of the clamp signal CLP may be the first voltage level (i.e., a voltage level of the reset signal RX, the transfer signal TX, or the select signal SEL, each of which has logic low). When the clamp signal CLP is activated, a voltage level of the clamp signal CLP may be a third voltage level higher than the first voltage level and lower than the second voltage level (i.e., a voltage level of the reset signal RX, the transfer signal TX, or the select signal SEL, each of which has logic high). The voltage level of the clamp signal CLP will be described in detail with reference to FIG. 8A below.

In an embodiment, the voltage level at the middle node MN may be a level of the voltage generated through a reset operation. For example, as the floating diffusion node FD is charged with a power supply voltage before the clamp signal CLP is activated, the voltage at the middle node MN may be a voltage generated by the drive transistor DT. That is, the select transistor ST may generate the clamp voltage VCLP based on the voltage at the middle node MN generated through the reset operation.

When the clamp signal CLP has the third voltage level (i.e., when the clamp signal CLP is activated), the select transistor ST may operate in a saturation region.

In an embodiment, when a value obtained by subtracting a voltage at a source terminal of the select transistor ST from a voltage at a gate terminal of the select transistor ST is greater than a threshold voltage of the select transistor ST, and a voltage at a drain terminal of the select transistor ST is greater than a value obtained by subtracting the threshold voltage of the select transistor ST from the voltage at the gate terminal of the select transistor ST, it may be determined that the select transistor ST operates in the saturation region.

Figure 8A:
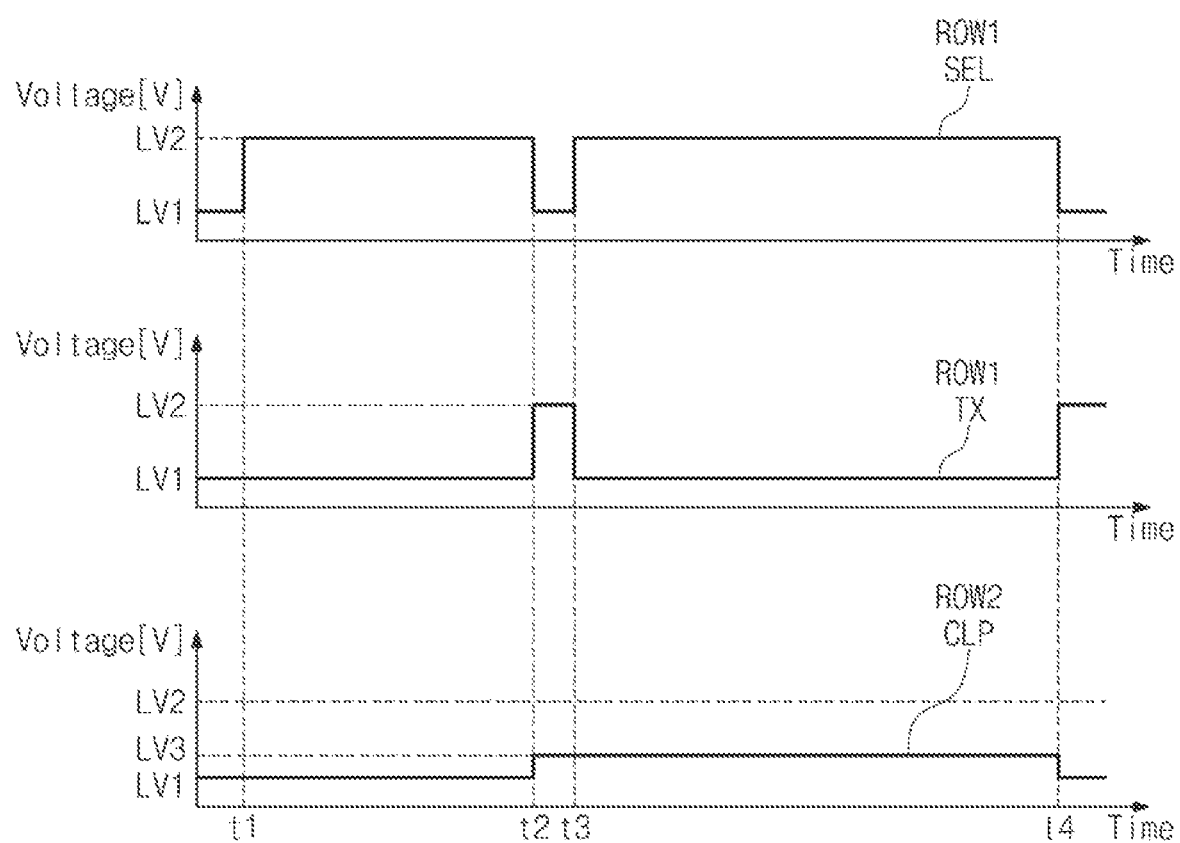
FIGS. 8A to 8C are timing diagrams illustrating an operation of the image sensor device of FIG. 6, according to some embodiments.
Figure 8B:
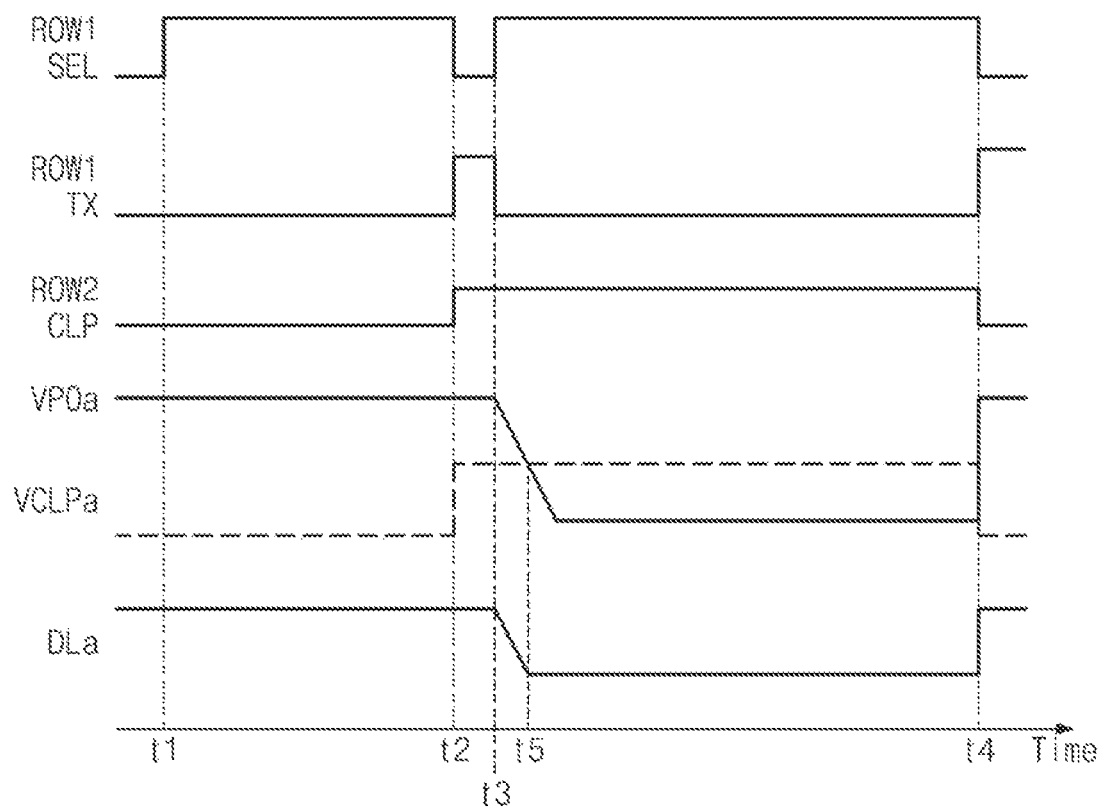
Figure 8C:
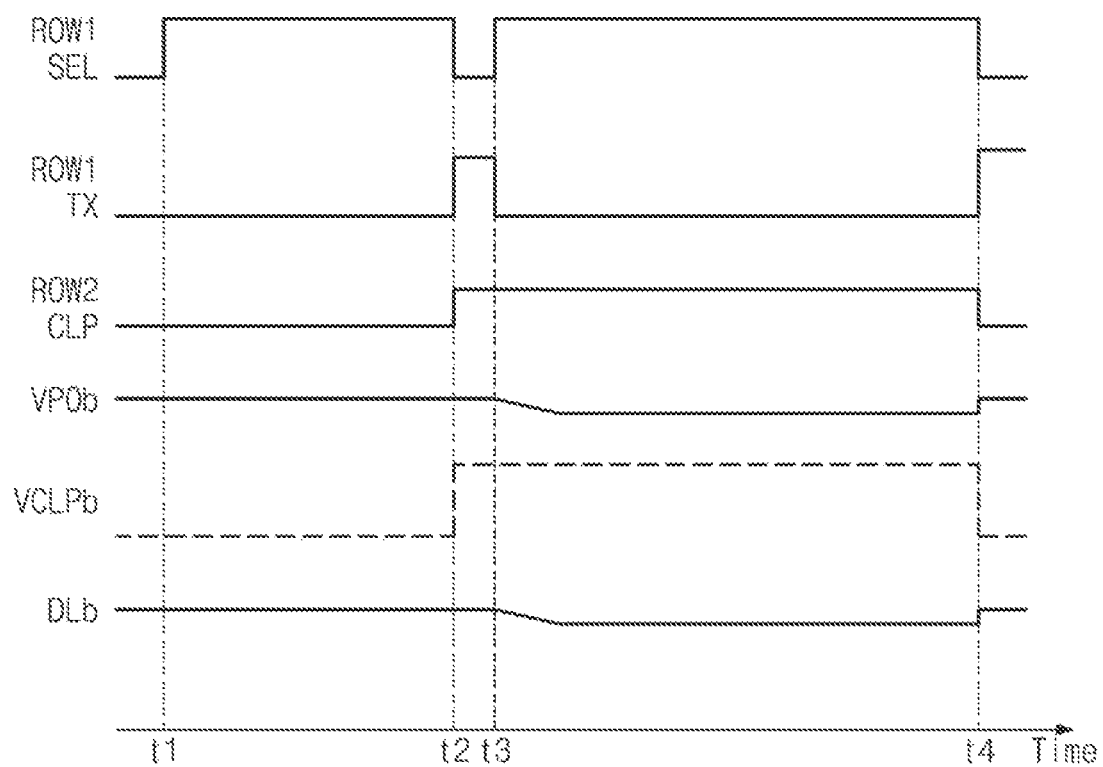

FIGS. 8A to 8C are timing diagrams illustrating an operation of the image sensor device of FIG. 6, according to some embodiments. FIG. 8A shows voltage levels of signals of the image sensor device 100 of FIG. 6. FIG. 8B shows a data line voltage for a first column of FIG. 6. FIG. 8C shows a data line voltage for a second column of FIG. 6.

Referring to FIGS. 6 and 8A, before the first time point t1, each of the select signal SEL, the transfer signal TX, and the clamp signal CLP may be a first voltage level LV1. Hereinafter, it is assumed that the select signal SEL and the transfer signal TX are signals provided to the first row ROW1, and the clamp signal CLP is a signal provided to the second row ROW2.

In a time interval between the first time point t1 and the second time point t2, a reset sampling operation may be performed on the first row ROW1 of image pixels. For example, a voltage level of the select signal SEL may be a second voltage level LV2. The clamp signal CLP may have the first voltage level LV1.

In a time interval between the second time point t2 and the third time point t3, a transfer operation may be performed on the first row ROW1 of image pixels. For example, a voltage level of the select signal SEL may be the first voltage level LV1, and a voltage level of the transfer signal TX for the first row ROW1 may be the second voltage level LV2.

In an embodiment, the voltage level of the clamp signal CLP may increase from the first voltage level LV1 to a third voltage level LV3 at the second time point t2. The third voltage level LV3 may be higher than the first voltage level LV1 and may be lower than the second voltage level LV2. However, the scope of the present disclosure is not limited thereto. For example, in some embodiments, the voltage level of the clamp signal CLP may transition from the first voltage level LV1 to the third voltage level LV3 at a time point between the first time point t1 and the third time point t3.

In an embodiment, when the voltage level of the clamp signal CLP is the third voltage level LV3, the clamp signal CLP may be referred to as activated. On the other hand, when the voltage level of the clamp signal CLP is not the third voltage level LV3 (i.e., when the voltage level of the clamp signal CLP is the first voltage level LV1), the clamp signal CLP may be referred to as inactivated.

In an embodiment, the third voltage level LV3 may be determined based on the analog gain of the analog-to-digital converter 130. That is, the third voltage level LV3 may be determined as a value, which is higher than the first voltage level LV1 and is lower than the second voltage level LV2, based on the analog gain. In other words, the scope of the present disclosure is not limited to any specific voltage level of the clamp signal CLP in the inactive state as long as the voltage level is higher than the first voltage level LV1 and lower than the second voltage level LV2.

In a time interval between the third time point t3 and the fourth time point t4, a data sampling operation may be performed on the first row ROW1 of image pixels. For example, the select signal SEL may be the second voltage level LV2, and the transfer signal TX may be the first voltage level LV1. In this case, the clamp signal CLP may be the third voltage level LV3.

FIG. 8B shows a voltage of a data line (e.g., the first data line DLa) corresponding to the first column of FIG. 6. Referring to FIGS. 6, 7, 8A, and 8B, in a time interval before the first time point t1, a reset operation may be performed on the first row ROW1. In a time interval between the first time point t1 and the second time point t2, a reset sampling operation may be performed on the first row ROW1. For example, the image pixel BPX may provide the first data line DLa with the first pixel output voltage VPOa corresponding to a reset voltage. In this case, the clamp signal CLP for the second row ROW2 may be the first voltage level LV1.

In a time interval between the second time point t2 and the third time point t3, a transfer operation may be performed on the first row ROW1. For example, a large amount of charges may flow into a floating diffusion node of the image pixel BPX.

In a time interval between the third time point t3 and the fourth time point t4, a data sampling operation may be performed on the first row ROW1. For example, the image pixel BPX may provide the first data line DLa with the first pixel output voltage VPOa corresponding to a data voltage. Accordingly, the first pixel output voltage VPOa may decrease from the third time point t3 (i.e., a time point at which the select signal SEL transitions to the second voltage level LV2).

In a time interval between the second time point t2 and the fourth time point t4, the clamp signal CLP may have the third voltage level LV3. In this case, the image pixel CPXa in the second row ROW2 may provide the first data line DLa with the first clamp voltage VCLPa corresponding to the third voltage level LV3.

In an embodiment, in a time interval between the second time point t2 and the fourth time point t4, the first clamp voltage VCLPa may have a constant voltage level. Accordingly, at a fifth time point t5 after the third time point t3 and before the fourth time point t4, the voltage level of the first pixel output voltage VPOa may be the same as the voltage level of the first clamp voltage VCLPa.

In an embodiment, a voltage level of the first data line DLa may be determined based on the higher voltage level among the voltage level of the first pixel output voltage VPOa and the voltage level of the first clamp voltage VCLPa. Accordingly, until the fifth time point t5 (i.e., until the voltage level of the first pixel output voltage VPOa is higher than the voltage level of the first clamp voltage VCLPa), the voltage level of the first data line DLa may be the same as the voltage level of the first pixel output voltage VPOa. On the other hand, after the fifth time point t5 (i.e., after the voltage level of the first pixel output voltage VPOa is lower than the voltage level of the first clamp voltage VCLPa), the voltage level of the first data line DLa may be the same as the voltage level of the first clamp voltage VCLPa.

In an embodiment, a voltage for the analog-to-digital converter 130 to output the digital signal DS having the maximum value may be changed depending on an analog gain. For example, even though a data voltage having a relatively high voltage level is provided from the image pixel BPX to the first data line DLa when an analog gain value of the analog-to-digital converter 130 increases, the first ADC circuit 132a may generate the first digital signal DSa having a maximum value (i.e., a full-code digital signal). Alternatively, even though a voltage level difference between a reset voltage and the data voltage, which are provided from the image pixel BPX to the first data line DLa, is relatively small when the analog gain value of the analog-to-digital converter 130 increases, the first ADC circuit 132a may generate the first digital signal DSa having the maximum value (i.e., the full-code signal).

In an embodiment, a voltage for the analog-to-digital converter 130 to output the digital signal DS having the maximum value may be changed depending on a saturation voltage. For example, the voltage level difference between the reset voltage and the data voltage, which are provided from the image pixel BPX to the first data line DLa, for generating the first digital signal DSa having the maximum value (i.e., the full-code signal), is relatively greater (compared to the case that a low saturation voltage is set) when a high saturation voltage is set for the analog-to-digital converter 130. That is, when a high saturation voltage value is set for the analog-to-digital converter 130, as long as a data voltage having a relatively low voltage level is provided from the image pixel BPX to the first data line DLa, the first ADC circuit 132a may generate the first digital signal DSa having the maximum value (i.e., the full-code signal).

According to an embodiment, a lower limit of the voltage level of the first data line DLa may be determined based on the first clamp voltage VCLPa. In detail, a level of the first clamp voltage VCLPa in a time interval between the second time point t2 and the fourth time point t4 may be set to be equal to or lower than a level of a data voltage for the first ADC circuit 132a to output the first digital signal DSa having the maximum value. For example, the voltage level of the first clamp voltage VCLPa may be determined based on a saturation voltage of the analog-to-digital converter 130 and an analog gain of the analog-to-digital converter 130. In this case, the fluctuation in the voltage level of the first data line DLa may be minimized. Accordingly, the image sensor device 100 having higher performance may be provided by reducing noise.

FIG. 8C shows a voltage of a data line (e.g., the second data line DLb) corresponding to the second column of FIG. 6. Hereinafter, it is assumed that a photodiode of the image pixel DPX generates little charge in response to an optical signal. That is, it is assumed that the image pixel DPX operates in a dark environment.

Referring to FIGS. 6, 7, and 8A to 8C, in a time interval before the first time point t1, a reset operation may be performed on the first row ROW1. In a time interval between the first time point t1 and the second time point t2, a reset sampling operation may be performed on the first row ROW1. For example, the image pixel DPX may provide the second data line DLb with the second pixel output voltage VPOb corresponding to a reset voltage. In this case, the clamp signal CLP for the second row ROW2 may be the first voltage level LV1.

In a time interval between the second time point t2 and the third time point t3, a transfer operation may be performed on the first row ROW1. However, it is assumed that only charges slightly flows into a floating diffusion node of the image pixel DPX (or it is assumed that a voltage at the floating diffusion node hardly decreases).

In a time interval between the third time point t3 and the fourth time point t4, a data sampling operation may be performed on the first row ROW1. For example, the image pixel DPX may provide the second data line DLb with the second pixel output voltage VPOb corresponding to a data voltage. In this case, the second pixel output voltage VPOb may have a voltage level higher than the first pixel output voltage VPOa. For example, the second pixel output voltage VPOb in a time interval between the third time point t3 and the fourth time point t4 may have a voltage level similar to the second pixel output voltage VPOb in a time interval between the first time point t1 and the second time point t2.

In a time interval between the second time point t2 and the fourth time point t4, the clamp signal CLP may have the third voltage level LV3. In this case, the image pixel CPXb in the second row ROW2 may provide the second data line DLb with the second clamp voltage VCLPb corresponding to the third voltage level LV3.

In an embodiment, the second clamp voltage VCLPb may be the same as the first clamp voltage VCLPa. For example, a level of the second clamp voltage VCLPb may be determined in a similar way to a level of the first clamp voltage VCLPa. Accordingly, for convenience of description, a detailed description of the second clamp voltage VCLPb is omitted to avoid redundancy.

In an embodiment, the second pixel output voltage VPOb may hardly decrease after the third time point t3. Accordingly, in a time interval between the third time point t3 and the fourth time point t4, the second pixel output voltage VPOb may always have a voltage level higher than the second clamp voltage VCLPb. Accordingly, a voltage level of the second data line DLb may be determined regardless of the second clamp voltage VCLPb. That is, the voltage level of the second data line DLb may be the same as the second pixel output voltage VPOb.

Referring again to FIGS. 8A to 8C, when a read-out operation is performed on a column that is not exposed to a bright light source (i.e., in an embodiment described with reference to FIG. 8C), a voltage level of a data line may be determined regardless of a clamp voltage. On the other hand, when a read-out operation is performed on a column exposed to a bright light source (i.e., in an embodiment described with reference to FIG. 8B), a voltage fluctuation of the data line may be reduced.

In an embodiment, when the voltage fluctuation of a data line in a column including a pixel exposed to the bright light source is reduced, a positive SHBN phenomenon may be reduced. For example, further referring to FIG. 4A, when the voltage fluctuation in the first data line DLa decreases, a coupling (1 coupling) between the first data line DLa and the transfer signal line TXL may be reduced. Accordingly, a coupling (2 coupling) with the second floating diffusion node FDb of the second image pixel PXb may be reduced. Accordingly, an unintended voltage level fluctuation of the second pixel output voltage VPOb may be reduced.

In an embodiment, when the data line voltage fluctuation in a column including a pixel exposed to a bright light source is reduced, a negative SHBN phenomenon may be reduced. For example, further referring to FIG. 5A, when the voltage fluctuation of the first data line DLa decreases, the voltage fluctuation of the first data line DLa may decreases, and thus an influence (①influence) on a current value of the first current source CSa may be reduced. Accordingly, an influence (②influence) on the power supply voltage VDD may be reduced. Accordingly, a coupling (③coupling) between the power supply voltage VDD and the second floating diffusion node FDb may decrease. Accordingly, an unintended voltage level fluctuation of the second pixel output voltage VPOb may be reduced.

Figure 9:
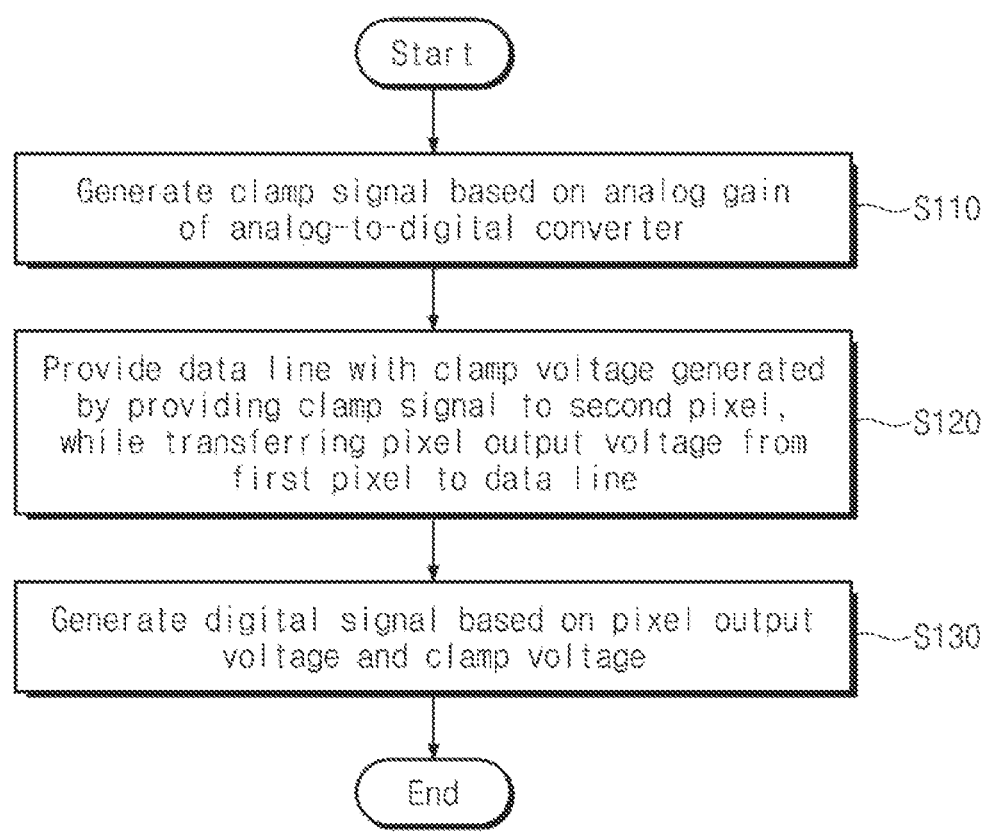
FIG. 9 is a flowchart illustrating an operation of the image sensor device of FIG. 6, according to an embodiment.

FIG. 9 is a flowchart illustrating an operation of the image sensor device of FIG. 6, according to an embodiment. Referring to FIGS. 6 and 9, in operation S110, the image sensor device 100 may generate the clamp signal CLP based on an analog gain of the analog-to-digital converter 130. For example, the sensor controller 140 may set the analog gain for the analog-to-digital converter 130. The sensor controller 140 may allow the clamp signal generator 150 to generate the clamp signal CLP corresponding to the set analog gain value.

In operation S120, the image sensor device 100 may provide the data line with a clamp voltage generated by providing a second image pixel with the clamp signal while transferring a pixel output voltage from a first image pixel to a data line. For example, the row decoder 120 may provide the first pixel output voltage VPOa (e.g., a data voltage) to the first data line DLa by providing the select signal SEL to the image pixel BPX (i.e., a first image pixel). At the same time, the row decoder 120 may transfer, to the image pixel CPXa (i.e., a second image pixel), the clamp signal CLP received from the clamp signal generator 150. The image pixel CPXa may generate the first clamp voltage VCLPa in response to the clamp signal CLP and then may provide the first clamp voltage VCLPa to the first data line DLa.

In operation S130, the image sensor device 100 may generate a digital signal based on a clamp voltage and a pixel output voltage. For example, the first ADC circuit 132a may be connected to the image pixel BPX (i.e., the first image pixel) and the image pixel CPXa (i.e., the second image pixel) through the first data line DLa. In this case, a voltage level of the first data line DLa may be determined based on the first pixel output voltage VPOa and the first clamp voltage VCLPa. In detail, the voltage level of the first data line DLa may be determined as the higher voltage level among the voltage levels of the first pixel output voltage VPOa and the first clamp voltage VCLPa. The first ADC circuit 132a may generate the first digital signal DSa based on the voltage level of the first data line DLa.

Figure 10:
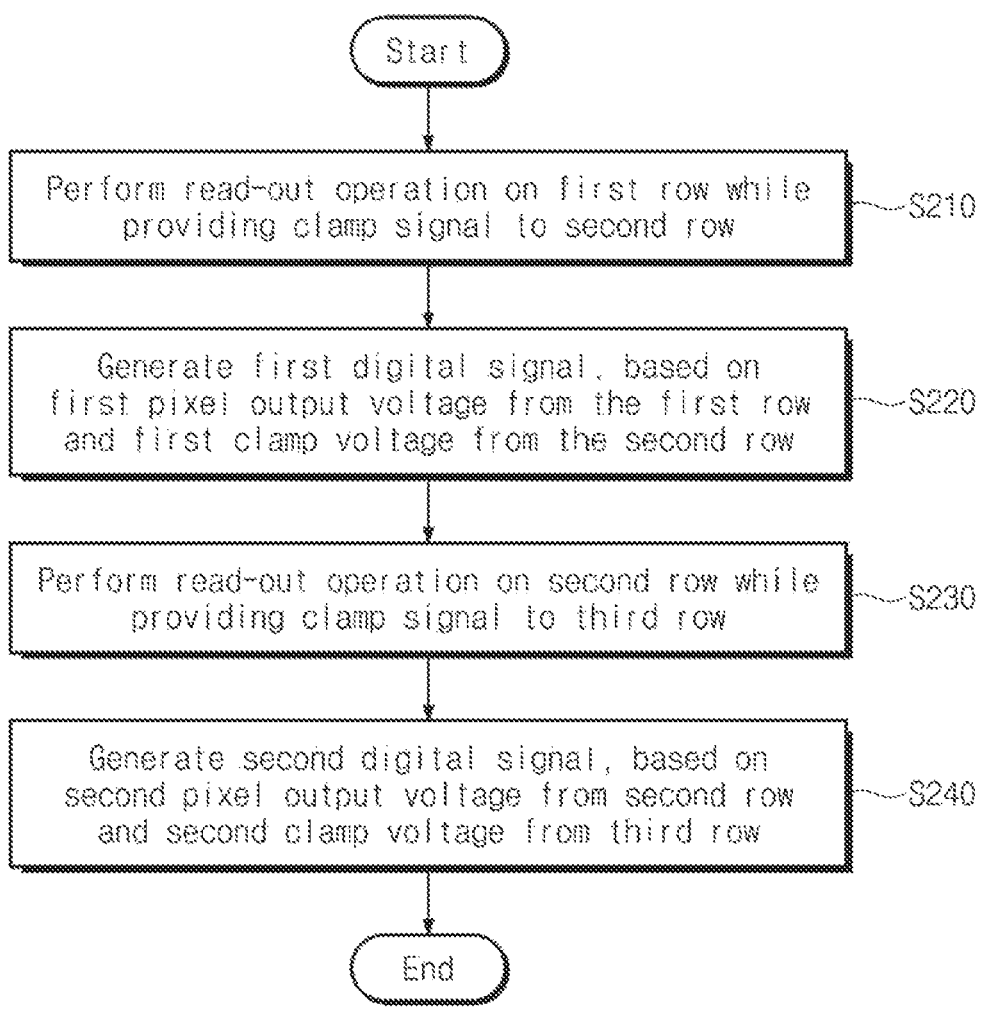
FIG. 10 is a flowchart illustrating an operation of the image sensor device of FIG. 6, according to an embodiment.

FIG. 10 is a flowchart illustrating an operation of the image sensor device of FIG. 6, according to an embodiment. Referring to FIGS. 6 and 10, in operation S210, the image sensor device 100 may perform a read-out operation on the first row ROW1 while providing a clamp signal to the second row ROW2. For example, the row decoder 120 may provide the select signal SEL to the first row ROW1 and may provide the clamp signal CLP to the second row ROW2.

In operation S220, the image sensor device 100 may generate a digital signal based on a pixel output voltage from the first row ROW1 and a clamp voltage from the second row ROW2. That is, the image sensor device 100 may clamp the pixel output voltage from the first row ROW1 using the second row ROW2.

In operation S230, the image sensor device 100 may perform a read-out operation on the second row ROW2 while providing a clamp signal to a third row (see FIGS. 3 and 6). For example, the row decoder 120 may provide the select signal SEL to the second row ROW2 and may provide the clamp signal CLP to a third row ROW3. That is, according to an embodiment, the image sensor device 100 may perform both a read-out operation and a clamping operation on a row of the pixel array 110. For example, the second row ROW2 may generate a reset voltage and a data voltage in response to the select signal SEL, and may generate a clamp voltage in response to the clamp signal CLP.

In operation S240, the image sensor device 100 may generate a digital signal based on a pixel output voltage from the second row ROW2 and a clamp voltage from the third row. That is, the image sensor device 100 may clamp the pixel output voltage from the second row ROW2 using the third row.

In an embodiment, a row that will perform the read-out operation may be adjacent to a row that will perform the clamping operation. For example, the row decoder 120 may apply the select signal SEL to a N-th row ('N' is an integer greater than or equal to 1) such that the read-out operation is performed, and may apply the clamp signal CLP to a (N+1)-th row such that the clamping operation is performed. However, the scope of the present disclosure is not limited thereto. For example, a row, on which the clamping operation of the row decoder 120 is to be performed, may be determined in various ways. For example, in some embodiments, the row decoder 120 may provide the clamp signal CLP to a row on which the next read-out operation is to be performed. In some embodiments, the row decoder 120 may provide the pixel array 110 with the select signal SEL and the clamp signal CLP such that the specific number of rows are positioned between a row performing the read-out operation and a row performing the clamping operation (e.g., the row decoder 120 may apply a select signal to the N-th row and may apply a clamp signal to a (N+m)-th row. In this case, 'm' may be an integer).

Figure 11:
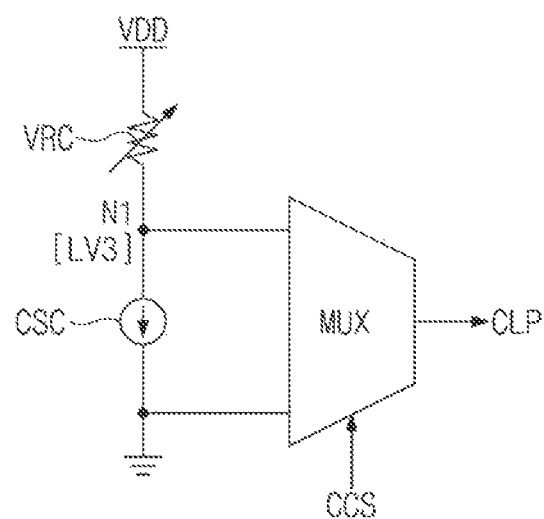
FIG. 11 is a circuit diagram showing the clamp signal generator of FIG. 1, according to an embodiment.

FIG. 11 is a circuit diagram showing the clamp signal generator of FIG. 1, according to an embodiment. Referring to FIGS. 1, 8A, and 11, the clamp signal generator 150 may include a variable resistor circuit VRC and a current source circuit CSC.

The variable resistor circuit VRC may be connected between the power supply voltage VDD and a first node N1. The first node N1 may have the third voltage level LV3. That is, a voltage level at the first node N1 may be determined as a voltage level in a time interval (e.g., the time interval between the second time point t2 and the fourth time point t4 in FIG. 8A) during which the clamp signal CLP is activated.

In an embodiment, the variable resistor circuit VRC may be determined based on an analog gain value of the analog-to-digital converter 130. For example, as the analog gain value increases, a resistance value of the variable resistor circuit VRC may be determined to be small. The resistance value of the variable resistor circuit VRC according to the analog gain value will be described in detail with reference to FIGS. 12A to 12B, 13 and 14A below.

In an embodiment, the variable resistor circuit VRC may be implemented in a similar method to a method of the ramp signal generator 131 of FIG. 2. For example, the variable resistor circuit VRC may include a resistor array corresponding to a variable resistor of the ramp signal generator 131. A configuration of the ramp signal generator 131 will be described with reference to FIGS. 12A to 12B below, and the corresponding configuration of the variable resistor circuit VRC will be described in detail with reference to FIG. 13A below.

The current source circuit CSC may be connected between the first node N1 and a ground voltage.

In an embodiment, the current value of the current source circuit CSC may be determined based on a level of a saturation voltage. For example, a current amount of the analog-to-digital converter 130 may be determined based on a potential difference between a reset voltage and a data voltage, which is required for the analog-to-digital converter 130 to generate the digital signal DS having a maximum value when the analog gain value is '1'. A configuration of the current source circuit CSC will be described in detail with reference to FIGS. 12A to 12B, 13, and 14A to 14B below.

In an embodiment, the voltage level of the clamp signal CLP may be determined as one of a voltage level of the first node N1 or a voltage level of the ground voltage. For example, the clamp signal generator 150 may include a multiplexer MUX. The multiplexer MUX may determine that a voltage level of the clamp signal CLP is one of a voltage level at the first node N1 or a voltage level of a ground voltage, in response to a control signal CCS from the sensor controller 140. That is, the multiplexer MUX may set the voltage level of the clamp signal CLP to the first voltage level LV1 or the third voltage level LV3 in response to the control signal CCS.

In an embodiment, the third voltage level LV3 may be determined based on a resistance value of the variable resistor circuit VRC and a current value of the current source circuit CSC. For example, the third voltage level LV3 may be determined as a value obtained by subtracting a value, which is obtained by multiplying the resistance value of the variable resistor circuit VRC and the current value of the current source circuit CSC, from the power supply voltage VDD.

For convenience of description, it is described that a voltage level of the clamp signal CLP is determined by the multiplexer MUX. However, the scope of the present disclosure is not limited thereto. For example, the voltage level of the clamp signal CLP may be determined as the first voltage level LV1 or the third voltage level LV3 through any combination of devices such as a switch, a transistor, and the like.

Figure 12A:
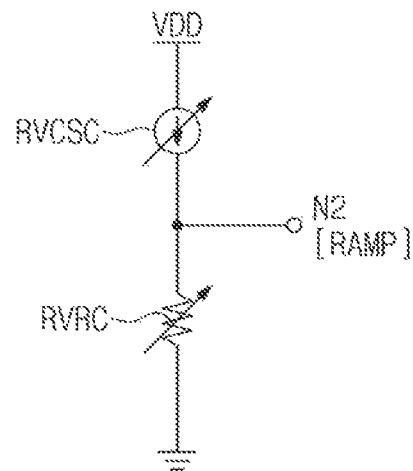
FIGS. 12A and 12B are circuit diagrams illustrating the ramp signal generator of FIG. 2, according to some embodiments.
Figure 12B:
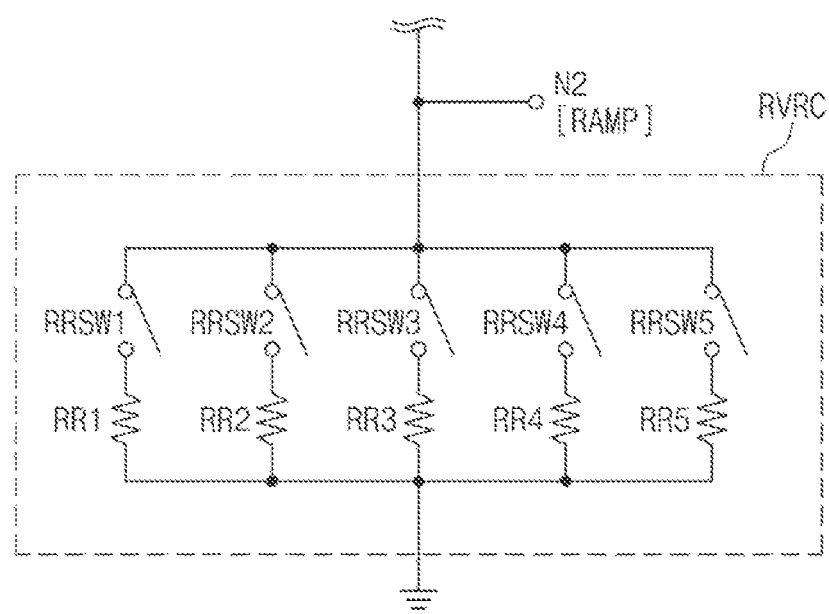

FIGS. 12A and 12B are circuit diagrams illustrating the ramp signal generator of FIG. 2, according to some embodiments. Referring to FIGS. 2, 8A, 11, and 12A, the ramp signal generator 131 may include a ramp variable current source circuit RVCSC and a ramp variable resistor circuit RVRC. The ramp variable current source circuit RVCSC may be connected between the power supply voltage VDD and a second node N2. The ramp variable resistor circuit RVRC may be connected between the second node N2 and a ground voltage.

A voltage level at the second node N2 may be determined as a voltage level of the ramp signal RAMP. That is, the ramp signal RAMP may refer to a voltage at the second node N2. Accordingly, the voltage level of the ramp signal RAMP may be determined as a value obtained by multiplying a resistance value of the ramp variable resistor circuit RVRC and a current value of the ramp variable current source circuit RVCSC.

In an embodiment, the resistance value of the ramp variable resistor circuit RVRC may be determined based on an analog gain value of the analog-to-digital converter 130. For example, in some embodiments, when the analog gain value is great, the ramp variable resistor circuit RVRC may have a small resistance value, and when the analog gain value is small, the ramp variable resistor circuit RVRC may have a great resistance value. In some embodiments, the resistance value of the ramp variable resistor circuit RVRC may be determined based on illumination of an environment in which the image sensor device 100 operates. For example, when the image sensor device 100 operates in a high illumination environment (i.e., a bright environment), the ramp variable resistor circuit RVRC may have a great resistance value. When the image sensor device 100 operates in a low illumination environment (i.e., a dark environment), the ramp variable resistor circuit RVRC may have a small resistance value.

In an embodiment, the ramp variable current source circuit RVCSC may have a current value that increases or decreases linearly (or non-linearly) during a specific time. Accordingly, the voltage level of the ramp signal RAMP may increase or decrease.

FIG. 12B is a circuit diagram illustrating the ramp variable resistor circuit RVRC of FIG. 12A in detail, according to some embodiments. Referring to FIGS. 2, 8A, 11, and 12A to 12B, the ramp variable resistor circuit RVRC may include a plurality of ramp resistors. Hereinafter, for convenience of description, it is assumed that the ramp variable resistor circuit RVRC includes a first ramp resistor RR1, a second ramp resistor RR2, a third ramp resistor RR3, a fourth ramp resistor RR4, and a fifth ramp resistor RR5. However, the scope of the present disclosure is not limited to the number of ramp resistors included in the ramp variable resistor circuit RVRC.

Each of the first to fifth ramp resistors RR1 to RR5 may be arranged between the second node N2 and a ground voltage. That is, each of the first to fifth ramp resistors RR1 to RR5 may be arranged in parallel between the second node N2 and the ground voltage. The first to fifth ramp resistors RR1 to RR5 may be connected between the second node N2 and the ground voltage through a first ramp resistor switch RRSW1, a second ramp resistor switch RRSW2, a third ramp resistor switch RRSW3, a fourth ramp resistor switch RRSW4, and a fifth ramp resistor switch RRSW5, respectively.

Each of the first to fifth ramp resistors RR1 to RR5 may correspond to an analog gain of the analog-to-digital converter 130. For example, the first ramp resistor RR1 may correspond to an analog gain value of '1'; the second ramp resistor RR2 may correspond to the analog gain value of '2'; the third ramp resistor RR3 may correspond to the analog gain value of '4'; the fourth ramp resistor RR4 may correspond to the analog gain value of '8'; and the fifth ramp resistor RR5 may correspond to the analog gain value of '16'. In this case, a resistance value of the ramp resistor may be inversely proportional to the corresponding analog gain value. For example, a resistance value of the first ramp resistor RR1 may be 16 times a resistance value of the fifth ramp resistor RR5; a resistance value of the second ramp resistor RR2 may be 8 times the resistance value of the fifth ramp resistor RR5; a resistance value of the third ramp resistor RR3 may be 4 times the resistance value of the fifth ramp resistor RR5; and, a resistance value of the fourth ramp resistor RR4 may be twice the resistance value of the fifth ramp resistor RR5.

As the corresponding analog gain value is determined, each of the first to fifth ramp resistors RR1 to RR5 may be connected between the second node N2 and the ground voltage under the control of the sensor controller 140. For example, the sensor controller 140 may set the analog gain to '2' for the analog-to-digital converter 130. In this case, the sensor controller 140 may connect the second ramp resistor RR2 between the second node N2 and the ground voltage such that the ramp variable resistor circuit RVRC has a resistance value corresponding to the analog gain value of '2'. That is, the sensor controller 140 may short the second ramp resistor switch RRSW2, and may open the other switches.

In an embodiment, when a high analog gain value is determined, the resistance value of the ramp variable resistor circuit RVRC may be determined to be low. In this case, compared to the case that the resistance value of the ramp variable resistor circuit RVRC is determined to be high, the voltage level of the ramp signal RAMP may decrease. The voltage level of the ramp signal RAMP according to the analog gain value will be described in detail with reference to FIG. 13 below.

Figure 13:
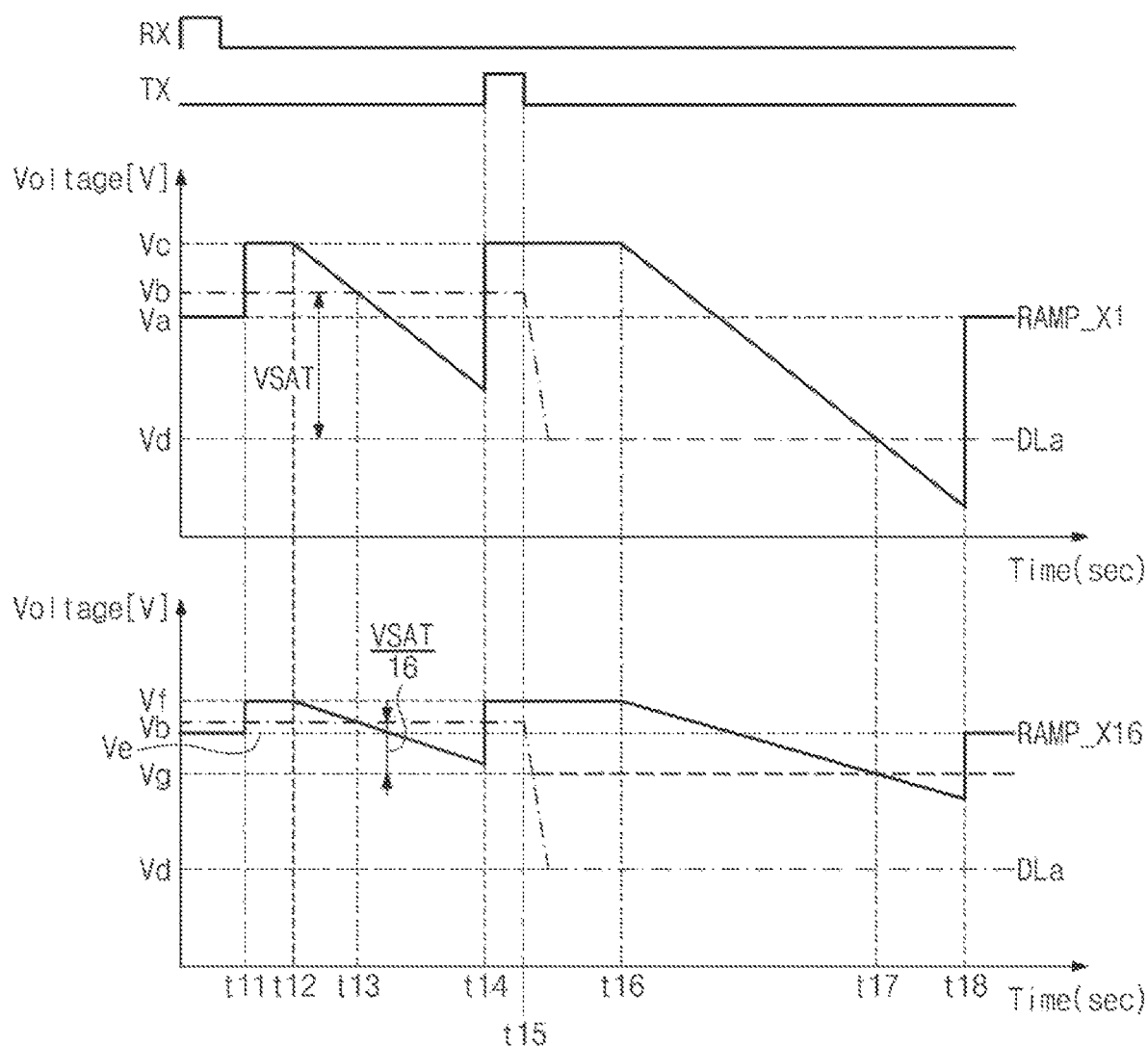
FIG. 13 is a timing diagram illustrating an operation of an image sensor device according to an analog gain value, according to some embodiments.

FIG. 13 is a timing diagram illustrating an operation of an image sensor device according to an analog gain value, according to an embodiment. Referring to FIGS. 1, 2, 6, 12A to 12B, and 13, a read-out operation may be performed on any image pixel. Hereinafter, for convenience of description, it is assumed that a read-out operation is performed on an image pixel (i.e., the image pixel BPX) in the first row and the first column. Moreover, it is described that a read-out operation is performed on the image pixel BPX based on an analog gain of '1' and is performed on the image pixel BPX based on the analog gain of '16'. However, the scope of the present disclosure is not limited thereto.

Before an eleventh time point t11, a reset operation may be performed on the image pixel BPX. For example, the reset signal RX may be logic high.

A reset sampling operation may be performed on the image pixel BPX in a time interval between the eleventh time point t11 and a fourteenth time point t14. In this case, a voltage level of the ramp signal RAMP may increase at the eleventh time point t11. For example, a voltage level of a ramp signal RAMP_X1 corresponding to an analog gain of '1' may increase from Va to Vc. A voltage level of a ramp signal RAMP_X16 corresponding to the analog gain of '16' may increase from Ve to Vf. In this case, a voltage level difference between Vf and Ve may be smaller than a voltage level difference between Vc and Va.

In an embodiment, a voltage level of the first data line DLa may be constantly maintained in a time interval between the eleventh time point t11 and the fourteenth time point t14. For example, a voltage level of the first data line DLa may be determined as a voltage level of a reset voltage of the image pixel BPX. In this case, the voltage level of the first data line DLa may be Vb.

In a time interval between a twelfth time point t12 and the fourteenth time point t14, the voltage level of the ramp signal RAMP may decrease. In this case, a slope at which the voltage level of the ramp signal RAMP decreases may be determined based on a corresponding analog gain value. For example, a slope at which the voltage level of the ramp signal RAMP_X1 corresponding to the analog gain of '1' decreases may be 16 times of a slope at which the voltage level of the ramp signal RAMP_X16 corresponding to the analog gain of '16' decreases.

The voltage level of the ramp signal RAMP decreasing in a time interval between the twelfth time point t12 and the fourteenth time point t14 may be the same as the voltage level (i.e., Vb) of the reset voltage at a thirteenth time point t13. In this case, the first ADC circuit 132a may perform sampling (i.e., reset sampling) in a time interval from the twelfth time point t12 to the thirteenth time point t13.

In a time interval between the fourteenth time point t14 and a fifteenth time point t15, a transfer operation may be performed on the image pixel BPX. For example, in a time interval between the fourteenth time point t14 and the fifteenth time point t15, the transfer signal TX may be logic high.

In an embodiment, at the fourteenth time point t14 at which the transfer operation starts, the voltage level of the ramp signal RAMP may increase. For example, the voltage level of the ramp signal RAMP_X1 corresponding to the analog gain of '1' may increase to Vc, and the voltage level of the ramp signal RAMP_X16 corresponding to the analog gain of '16' may increase to Vf.

In an embodiment, the voltage level of the first data line DLa may decrease in a time interval between the fifteenth time point t15 and a sixteenth time point t16. For example, the voltage level of the first data line DLa may be reduced to a level of a data voltage of the image pixel BPX. Accordingly, the voltage level of the first data line DLa may decrease from Vb to Vd.

In an embodiment, levels of the reset voltage and the data voltage may be determined regardless of the analog gain.

In a time interval between the sixteenth time point t16 and an eighteenth time point t18, the voltage level of the ramp signal RAMP may decrease. In this case, a slope of the ramp signal RAMP may be the same as a slope between the twelfth time point t12 and the fourteenth time point t14. For example, a slope of the ramp signal RAMP_X1 corresponding to the analog gain of '1' may be 16 times of a slope of the ramp signal RAMP_X16 corresponding to the analog gain of '16'.

The voltage level of the ramp signal RAMP_X1 corresponding to the analog gain '1' decreasing in the time interval between the sixteenth time point t16 and the eighteenth time point t18 may be the same as a voltage level (i.e., Vd) of the data voltage at a seventeenth time point t17. In this case, the first ADC circuit 132a may perform sampling (i.e., data sampling) in a time interval from the sixteenth time point t16 to the seventeenth time point t17.

The first ADC circuit 132a may generate the first digital signal DSa based on a difference between the time interval from the sixteenth time point t16 to the seventeenth time point t17 and the time interval from the twelfth time point t12 to the thirteenth time point t13. For example, the first ADC circuit 132a may measure the level of the reset voltage through reset sampling and may measure the level of the data voltage through data sampling. The first ADC circuit 132a may calculate a potential difference between the measured reset voltage and the measured data voltage. The first ADC circuit 132a may generate the first digital signal DSa based on the calculated potential difference.

In an embodiment, the first digital signal DSa may be determined in a finite range. For example, the digital signal DS may be 10-digit binary number data. In this case, the first digital signal DSa may correspond to one of binary numbers from "0000000000" to "1111111111". However, the scope of the present disclosure is not limited thereto. For example, the first digital signal DSa may have various digits, such as 8 digits or 12 digits.

In an embodiment, when the level of the data voltage is Vd, the first digital signal DSa having the maximum value may be generated based on the ramp signal RAMP_X1 corresponding to the analog gain of '1'. For example, when the level of the data voltage is Vd, the first ADC circuit 132a may generate the digital signal DS corresponding to "111111111" based on the ramp signal RAMP_X1 corresponding to the analog gain of '1'. In this case, it may be determined that the first digital signal DSa has a maximum value or a "full-code".

In an embodiment, a voltage level difference between a reset voltage and a data voltage for generating the first digital signal DSa having the maximum value based on the ramp signal RAMP_X1 corresponding to the analog gain of '1' may be referred to as a "saturation voltage VSAT". That is, the saturation voltage VSAT may refer to a minimum value of a difference in level between a reset voltage and a data voltage for generating the first digital signal DSa having the maximum value based on the analog gain of '1'.

On the other hand, the voltage level of the data voltage required for the first ADC circuit 132a to generate the first digital signal DSa, which is a full-code, based on the ramp signal RAMP_X16 corresponding to the analog gain of '16' may be Vg. In this case, Vg may be a voltage level higher than Vd. Accordingly, when the data voltage is lower than Vg, the first ADC circuit 132a may generate the first digital signal DSa having a maximum value (or a full-code).

That is, when a digital signal is generated based on a ramp signal corresponding to a high analog gain value, a voltage level of a data voltage required to generate a digital signal having the maximum value may increase compared to the case that a digital signal is generated based on a ramp signal corresponding to a low analog gain value. For example, when generating the first digital signal DSa based on the ramp signal RAMP_X16 corresponding to the analog gain of '16', the first ADC circuit 132a may generate the first digital signal DSa having a maximum value even though a potential difference between the reset voltage and the data voltage is 1/16 of the saturation voltage VSAT (i.e., VSAT/16). Accordingly, even when the voltage level of the first data line DLa is Vg higher than Vd, the first ADC circuit 132a may generate the first digital signal DSa having the maximum value.

In an embodiment, when the voltage level of the data line is clamped based on the analog gain, a voltage fluctuation of a data line may be minimized within a range in which a digital signal having the maximum value is generated. For example, when the read-out operation is performed on the image pixel BPX based on the analog gain of '16', the image pixel CPXa may provide the first clamp voltage VCLPa to the first data line DLa in response to the clamp signal CLP. In this case, the voltage level of the first clamp voltage VCLPa may be Vg (shown as a dotted line). Accordingly, in the time interval between the fifteenth time point t15 and the sixteenth time point t16, the voltage level of the first data line DLa may decrease from Vb to Vg instead of decreasing from Vb to Vd. That is, in the time interval between the fifteenth time point t15 and the sixteenth time point t16, the degree of a decrease in the voltage level of the first data line DLa may be reduced. However, the scope of the present disclosure is not limited thereto. For example, the voltage level of the clamp voltage may be determined as a voltage level lower than Vg and higher than Vd. That is, the voltage level of the clamp voltage may be determined as a voltage level that is equal to or lower than the voltage level of the data voltage required to generate a digital signal having the maximum value.

Figure 14A:
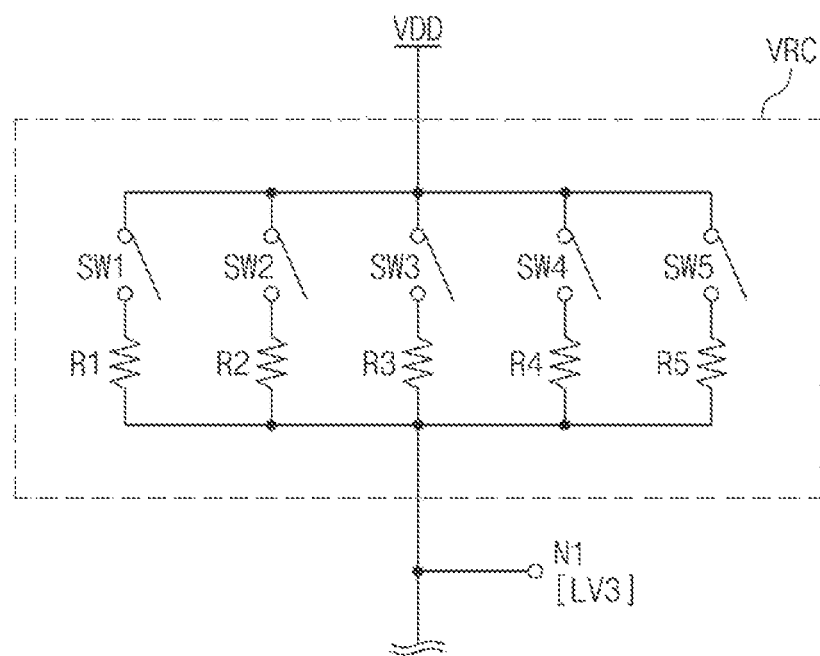
FIGS. 14A and 14B are circuit diagrams illustrating the clamp signal generator of FIG. 11 in detail, according to some embodiments.
Figure 14B:
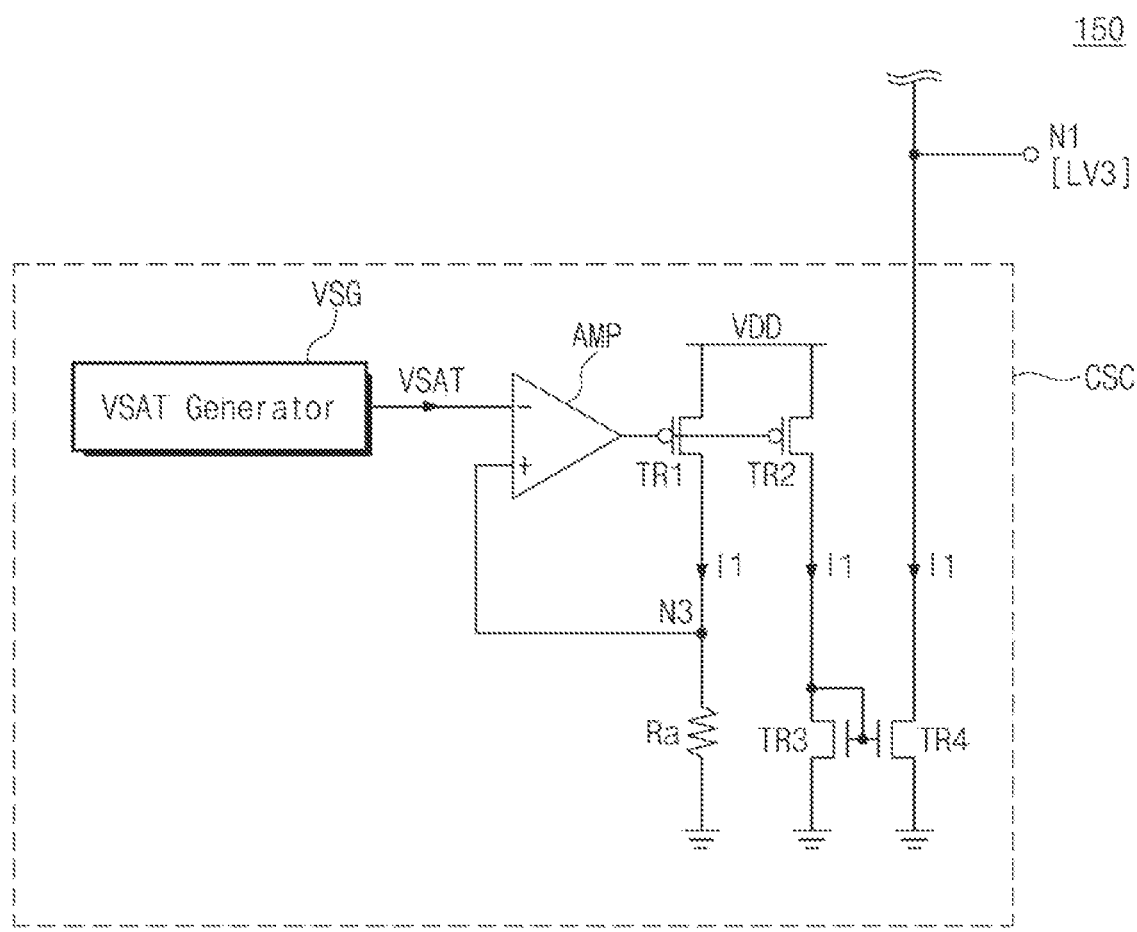

FIGS. 14A and 14B are circuit diagrams illustrating some configurations of the clamp signal generator of FIG. 11 in detail, according to some embodiments. Referring to FIGS. 11 to 14A, a variable resistor circuit VRC may include a plurality of resistors. For example, the variable resistor circuit VRC may include a first resistor R1, a second resistor R2, a third resistor R3, a fourth resistor R4, and a fifth resistor R5.

Each of the first to fifth resistors R1 to R5 may be arranged in parallel between the first node N1 and the power supply voltage VDD. The first to fifth resistors R1 to R5 may be connected between the first node N1 and the power supply voltage VDD through a first switch SW1, a second switch SW2, a third switch SW3, a fourth switch SW4, and a fifth switch SW5, respectively.

In an embodiment, resistance values of the first to fifth resistors R1 to R5 may correspond to resistance values of the first to fifth ramp resistors RR1 to RR5, respectively. In some embodiments, a ratio of resistance values between the first to fifth resistors R1 to R5 may be the same as a ratio of resistance values between the first to fifth ramp resistors RR1 to RR5. For example, the resistance value of the first resistor R1 may be 16 times the resistance value of the fifth resistor R5; the resistance value of the second resistor R2 may be 8 times the resistance value of the fifth resistor R5; the resistance value of the third resistor R3 may be 4 times the resistance value of the fifth resistor R5; and, the resistance value of the fourth resistor R4 may be twice the resistance value of the fifth resistor R5. However, the scope of the present disclosure is not limited to the number of resistors included in the variable resistor circuit VRC, or a ratio of resistance values between the resistors.

A resistance value of the variable resistor circuit VRC may be determined based on an analog gain value. That is, the resistance value of the variable resistor circuit VRC may be determined based on a resistance value of the ramp variable resistor circuit RVRC. For example, when an analog gain value of the analog-to-digital converter 130 is '1', the first ramp resistor switch RRSW1 may be closed, and the first switch SW1 corresponding to the first ramp resistor switch RRSW1 may be closed. As in the above description, when the analog gain value is '16', the analog-to-digital converter 130 may close the fifth ramp resistor switch RRSW5, and may close the fifth switch SW5 corresponding to the fifth ramp resistor switch RRSW5.

In an embodiment, even when an image pixel outputs a data voltage (i.e., a data voltage having a small voltage level difference from a voltage level of a reset voltage) having a relatively high voltage level to the data line DL when the analog-to-digital converter 130 operates based on a high analog gain value, a digital signal having a maximum value may be output by the analog-to-digital converter 130. In this case, as the resistance value of the variable resistor circuit VRC is determined based on an analog gain value, the voltage fluctuation of the data line DL may be reduced. For example, the resistance value of the variable resistor circuit VRC may be set to be low (e.g., the fifth switch SW5 corresponding to the fifth resistor R5 may be shorted) in response to a fact that a high analog gain value is determined. When the resistance value of the variable resistor circuit VRC is lowered, a voltage level at the first node N1 or the third voltage level LV3 may increase. Accordingly, in a time interval (e.g., a time interval between the second time point t2 and the fourth time point t4 in FIG. 8A) in which the clamp signal CLP is activated, the voltage level of the clamp signal CLP may increase. As a result, a voltage level of the clamp voltage VCLP may increase up to a voltage level required for the analog-to-digital converter 130 to output a digital signal of a full-code.

In an embodiment, when a voltage fluctuation of the data line DL decreases, both a positive SHBN phenomenon and a negative SHBN phenomenon may be reduced. The reason that the positive SHBN phenomenon and the negative SHBN phenomenon are reduced is described in detail with reference to FIGS. 2 to 9 above, and thus a more detailed description will be omitted to avoid redundancy.

Then, referring to FIGS. 11 to 14B, a current source circuit CSC may include a VSAT generator VSG, an amplifier AMP, a resistor Ra, and a first transistor TR1, a second transistor TR2, a third transistor TR3, and a fourth transistor TR4.

In an embodiment, the first and second transistors TR1 and TR2 may be implemented as P-channel metal oxide semiconductor (PMOS) transistors, and the third and fourth transistors TR3 and TR4 may be implemented as N-channel metal oxide semiconductor (NMOS) transistors. However, the scope of the present disclosure is not limited to the type of a transistor.

The VSAT generator VSG may generate the saturation voltage VSAT. In an embodiment, the saturation voltage VSAT may refer to a difference between a reset voltage and a data voltage, which are required to generate the digital signal DS of a full-code when the analog-to-digital converter 130 operates with an analog gain of '1'. However, the scope of the present disclosure is not limited thereto.

In an embodiment, the saturation voltage VSAT may be determined based on the performance of the image sensor device 100. For example, the saturation voltage VSAT may be set by the sensor controller 140 based on a light-collecting ability (e.g., the amount of charges to be accumulated through the photodiode PD during a unit time) of the image pixel PX, an operating speed (e.g., a time required for the ADC circuit 132 to receive another reset voltage after the ADC circuit 132 receives a reset voltage, a time for the ADC circuit 132 to receive a reset voltage after the ADC circuit 132 receives a data voltage, or a frequency of a clock received by the ADC circuit 132) of the ADC circuit 132.

The amplifier AMP may receive the saturation voltage VSAT from the VSAT generator VSG through a first input terminal (e.g., an inverting input terminal) of the amplifier AMP. A second input terminal (e.g., a non-inverting input terminal) of the amplifier AMP may be connected to a third node N3.

The first transistor TR1 may be connected between the power supply voltage VDD and the third node N3. The gate terminal of the first transistor TR1 may be connected to an output terminal of the amplifier AMP. The resistor Ra may be connected between the third node N3 and a ground voltage. In this case, the amount of a current flowing from the power supply voltage VDD to the ground voltage may be referred to as a "first current I1".

The second transistor TR2 may be connected between the power supply voltage VDD and a drain terminal of the third transistor TR3. A gate terminal of the second transistor TR2 may be connected to the output terminal of the amplifier AMP.

A source terminal of the third transistor TR3 may be connected to the ground voltage. A gate terminal of the third transistor TR3 may be connected to a gate terminal of the fourth transistor TR4. Moreover, the gate terminal of the third transistor TR3 may be connected to a drain terminal of the third transistor TR3.

The fourth transistor TR4 may be connected between the first node N1 and the ground voltage. In this case, the amount of a current flowing from the power supply voltage VDD to the ground voltage through the third transistor TR3 and the amount of a current flowing from the first node N1 to the ground voltage through the fourth transistor TR4 may be the first current I1.

That is, the current source circuit CSC may generate the first current I1 based on the saturation voltage VSAT. In this case, a voltage level of the clamp signal CLP may be appropriately adjusted based on the saturation voltage VSAT. Accordingly, according to an embodiment, both the positive SHBN phenomenon and the negative SHBN phenomenon may be reduced.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

According to an embodiment of the present disclosure, an image sensor device for clamping an output voltage from an image pixel may be provided. In this case, a voltage fluctuation in a data line is minimized, and thus a coupling phenomenon may be reduced. Accordingly, the image sensor device having improved performance and an operating method thereof may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor device comprising:
   a first image pixel connected to a first data line;
   a second image pixel connected to the first data line;
   an analog-to-digital converter configured to generate a digital signal based on a ramp signal and a voltage level of the first data line; and
   a clamp signal generator configured to generate a clamp signal depending on an analog gain of the analog-to-digital converter,
   wherein, while a data voltage is provided from the first image pixel to the first data line, the second image pixel provides a clamp voltage to the first data line based on the clamp signal, and while the data voltage is provided from the first image pixel to the first data line, a first select transistor of the first image pixel operates in a triode region, and a second select transistor of the second image pixel operates in a saturation region.

2. The image sensor device of claim 1, wherein the voltage level of the first data line is determined as a voltage level of the data voltage in a first time interval in which the voltage level of the data voltage is higher than a voltage level of the clamp voltage, and is determined as the voltage level of the clamp voltage in a second time interval in which the voltage level of the data voltage is lower than the voltage level of the clamp voltage.

3. The image sensor device of claim 1, wherein the first image pixel includes:
   a first photodiode configured to accumulate charges based on a first optical signal;
   a first transfer transistor connected between the first photodiode and a first floating diffusion node and configured to operate based on a first transfer signal;
   a first reset transistor connected between a power supply voltage and the first floating diffusion node and configured to operate based on a first reset signal;
   a first drive transistor connected between the power supply voltage and a first middle node and configured to operate based on a voltage at the first floating diffusion node; and
   the first select transistor connected between the first middle node and the first data line and configured to operate based on a select signal.

4. The image sensor device of claim 3, wherein the second image pixel includes:
   a second photodiode configured to accumulate charges based on a second optical signal;
   a second transfer transistor connected between the second photodiode and a second floating diffusion node and configured to operate based on a second transfer signal;
   a second reset transistor connected between the power supply voltage and the second floating diffusion node and configured to operate based on a second reset signal;
   a second drive transistor connected between the power supply voltage and a second middle node and configured to operate based on a voltage at the second floating diffusion node; and
   the second select transistor connected between the second middle node and the first data line and configured to operate based on a voltage level of the clamp signal.

5. The image sensor device of claim 4, wherein, while the data voltage is provided from the first image pixel to the first data line, the voltage level of the clamp signal is lower than a voltage level of the select signal.

6. The image sensor device of claim 4, wherein the second select transistor operates as a source follower.

7. The image sensor device of claim 1, wherein the clamp signal has a first voltage level during a first time interval during which a reset voltage for the first image pixel is generated, and has a second voltage level higher than the first voltage level during a second time interval during which the data voltage is provided from the first image pixel to the first data line.

8. The image sensor device of claim 1, wherein the clamp signal generator includes:
   a variable resistor circuit connected between a first node and a power supply voltage; and
   a current source circuit connected between the first node and a ground voltage,
   wherein a voltage level of the clamp signal is determined based on a voltage level at the first node and a voltage level of the ground voltage.

9. The image sensor device of claim 8, wherein the analog-to-digital converter includes a ramp signal generator configured to generate the ramp signal,
   wherein the ramp signal generator includes:
   a variable current source circuit connected between a second node for outputting the ramp signal and the power supply voltage; and
   a ramp variable resistor circuit connected between the second node and the ground voltage,
   wherein a resistance value of the variable resistor circuit is changed depending on a resistance value of the ramp variable resistor circuit.

10. The image sensor device of claim 8, wherein the current source circuit operates based on a saturation voltage for the analog-to-digital converter to output a digital signal having a maximum value.

11. The image sensor device of claim 1, wherein, when a voltage level of the data voltage is not greater than a third voltage level, the analog-to-digital converter outputs a digital signal having a maximum value, and
   wherein, while the data voltage is provided from the first image pixel to the first data line, a voltage level of the clamp voltage is lower than the third voltage level.

12. An image sensor device comprising:
   a pixel array including a plurality of image pixels arranged in a row direction and a column direction;
   an analog-to-digital converter configured to generate a digital signal based on a voltage output from a first row and a second row of the pixel array;

a clamp signal generator configured to generate a clamp signal depending on an analog gain of the analog-to-digital converter; and a row decoder configured to generate a select signal and to provide the select signal or the clamp signal to the first row and the second row, wherein, when a read-out operation is performed on the first row, the second row outputs a clamp voltage in response to the clamp signal, and wherein, when a read-out operation is performed on the second row, the second row outputs a reset voltage or a data voltage in response to the select signal, and wherein the row decoder is configured to provide the clamp signal or the select signal to gate terminals of select transistors of pixels in the second row, and wherein, while reset or the data voltage output from the second row, the select transistors of the pixels in the second row operate in a triode region, and select signals of pixels in the first row operate in a saturation region.

13. The image sensor device of claim 12, wherein, when the select signal is activated, the select signal has a first voltage level, and wherein, when the clamp signal is activated, the clamp signal has a second voltage level lower than the first voltage level.

14. The image sensor device of claim 13, wherein the second voltage level is based on a level of the data voltage for the analog-to-digital converter to generate a digital signal having a maximum value.

15. The image sensor device of claim 12, wherein the first row and the second row are connected through a data line, and wherein the analog-to-digital converter is configured to:
generate the digital signal based on a voltage level of the data line.

16. The image sensor device of claim 15, wherein, when the read-out operation is performed on the first row:

the data line has a level of the voltage output from the first row in a first time interval in which the level of the voltage output from the first row is higher than a level of the voltage output from the second row, and the data line has the level of the voltage output from the second row in a second time interval in which the level of the voltage output from the first row is lower than the level of the voltage output from the second row.

17. An operating method of an image sensor device including an analog-to-digital converter that generates a digital signal based on voltages output from a first image pixel and a second image pixel to a data line, the method comprising:

generating a clamp signal based on an analog gain of the analog-to-digital converter;

while transmitting a pixel output voltage from the first image pixel to the data line, providing the data line with a clamp voltage, which is generated by providing the clamp signal to the second image pixel; and generating the digital signal from the data line based on the pixel output voltage and the clamp voltage, wherein while the pixel output voltage is provided from the first image pixel to the data line, a first select transistor of the first image pixel operates in a triode region, and a second select transistor of the second image pixel operates in a saturation region.

18. The method of claim 17, wherein a voltage level of the data line is determined as a higher voltage level among a voltage level of the pixel output voltage and a voltage level of the clamp voltage, and wherein the analog-to-digital converter is configured to:
generate the digital signal based on the voltage level of the data line that is determined.

* * * * *